(12) United States Patent
Rav-Acha et al.

(10) Patent No.: US 9,569,100 B2
(45) Date of Patent: Feb. 14, 2017

(54) METHOD AND SYSTEM FOR SCRIBBLE BASED EDITING

(71) Applicant: MAGISTO LTD., Nes-Ziona (IL)

(72) Inventors: Alexander Rav-Acha, Rehovot (IL); Oren Boiman, Givat Brener (IL)

(73) Assignee: MAGISTO LTD., Nes-Ziona (IL)

( * ) Notice: Subject to any disclaimer, the term of this patent is extended or adjusted under 35 U.S.C. 154(b) by 270 days.

(21) Appl. No.: 13/947,183

(22) Filed: Jul. 22, 2013

(65) Prior Publication Data

US 2014/0026054 A1    Jan. 23, 2014

Related U.S. Application Data

(60) Provisional application No. 61/674,349, filed on Jul. 22, 2012.

(51) Int. Cl.
*G06F 3/0488* (2013.01)
*G11B 27/031* (2006.01)
*G06T 11/60* (2006.01)
*G06F 3/0484* (2013.01)

(52) U.S. Cl.
CPC ....... *G06F 3/04883* (2013.01); *G06F 3/04845* (2013.01); *G06T 11/60* (2013.01); *G11B 27/031* (2013.01)

(58) Field of Classification Search
CPC ..... G11B 27/34; G11B 27/034; G11B 27/105; G11B 27/031; G11B 27/28; G11B 27/06; G11B 27/022; G06F 3/04883; G06F 3/017; G06F 3/0481; G06F 3/0488; G06F 2203/04807; G06F 17/242; G06F 3/0386; G06F 3/03545

See application file for complete search history.

(56) References Cited

U.S. PATENT DOCUMENTS

| | | | |
|---|---|---|---|
| 5,809,267 A * | 9/1998 | Moran et al. | 715/863 |
| 5,864,635 A * | 1/1999 | Zetts et al. | 382/187 |
| 6,057,845 A * | 5/2000 | Dupouy | 715/863 |
| 7,073,127 B2 * | 7/2006 | Zhao et al. | 715/719 |
| 7,895,536 B2 * | 2/2011 | Fitzmaurice et al. | 715/860 |
| 8,341,558 B2 * | 12/2012 | Li | 715/863 |
| 8,436,821 B1 * | 5/2013 | Plichta et al. | 345/173 |
| 8,447,752 B2 * | 5/2013 | Wang et al. | 707/711 |
| 2004/0001079 A1 * | 1/2004 | Zhao et al. | 345/719 |
| 2004/0119763 A1 * | 6/2004 | Mizobuchi | G06F 3/04883 715/863 |

(Continued)

OTHER PUBLICATIONS

Plamondon, R.E, "Online and off-line handwriting recognition: a comprehensive survey", IEEE Transactions on Pattern Analysis and Machine Intelligence, 2000, vol. 22, pp. 63-84.

(Continued)

*Primary Examiner* — Nicholas Ulrich
(74) *Attorney, Agent, or Firm* — Pearl Cohen Zedek Latzer Baratz LLP

(57) ABSTRACT

A method and a non-transitory computer readable medium that stores instructions for: receiving a group of media entities; receiving a scribble; applying media editing commands on the group of the media entities to provide a media stream, wherein the media editing commands comprise at least one scribble-selected media editing command that is selected in response to the scribble.

6 Claims, 23 Drawing Sheets

(56) References Cited

U.S. PATENT DOCUMENTS

| | | | |
|---|---|---|---|
| 2006/0001656 A1* | 1/2006 | LaViola, Jr. | G06F 3/04883 345/179 |
| 2006/0085767 A1* | 4/2006 | Hinckley et al. | 715/863 |
| 2007/0133947 A1* | 6/2007 | Armitage et al. | 386/95 |
| 2008/0079751 A1* | 4/2008 | Arrasvuori | 345/629 |
| 2009/0027400 A1* | 1/2009 | Marggraff et al. | 345/473 |
| 2010/0185949 A1* | 7/2010 | Jaeger | 715/730 |
| 2011/0218997 A1 | 9/2011 | Boiman et al. | |
| 2013/0073952 A1* | 3/2013 | Dontcheva | G06F 17/242 715/246 |
| 2013/0249815 A1* | 9/2013 | Dolan et al. | 345/173 |

OTHER PUBLICATIONS

Mori G., B.S. "Efficient Shape Matching Using Shape Contexts", IEEE Transactions on Pattern Analysis and Machine Intelligence, 2005., vol. 27, No. 11, pp. 1832- 1837.

Boiman et al. "In defence of Nearest-Neigbhor Based Image Classification", CVPR, 2008.

H. Chen et al. "Robust text detection in natural images with edge-enhanced maximally stable extremal regions" IEEE International Conference on Image Processing, Sep. 2011.

Eitz Mathias et al. "Sketch-Based Image Retrieval: Benchmark and Bag-of-Features Descriptors". IEEE Transactions on Visualization and Computer Graphics, vol. 17, No. 11, pp. 1624-1636, 2011.

* cited by examiner 41-45

63

62

61

91-95

METHOD AND SYSTEM FOR SCRIBBLE BASED EDITING

RELATED APPLICATIONS

This application claims the priority of US provisional patent filing date Jul. 22, 2012 and Ser. No. 61/674,349 which is incorporated herein by reference.

BACKGROUND

One of the main challenges of semi-automatic video editing is to allow users to contribute without having any technical skills or even general know-how around video editing.

SUMMARY OF THE INVENTION

According to an embodiment of the invention there may be provided a non-transitory computer readable medium may store instructions for: receiving a group of media entities; receiving a scribble; and applying media editing commands on the group of the media entities to provide a media stream, wherein the media editing commands comprise at least one scribble-selected media editing command that is selected in response to the scribble.

The non-transitory computer readable medium may store instructions for searching for a match between a scribble and a predetermined scribble associated with scribble-selected media editing commands, and selecting a scribble-selected media editing command to be applied on the group of media entities if the scribble-selected media editing command is associated with a predetermined scribble that matches one of the scribble segments The searching for a match may include applying a descriptor based matching algorithm.

The searching for a match may include applying a shape based matching algorithm.

The non-transitory computer readable medium may store instructions for extracting one or more characteristics of the scribble and selecting the at least one scribble-selected media editing command in response to the one or more characteristics of the scribble.

The non-transitory computer readable medium may store instructions for extracting a characteristic of the scribble and selecting a scribble-selected media editing command to be applied on the group of media entities if the scribble-selected media editing command is associated with the characteristic of the scribble and is not associated with any of the predetermined scribbles.

The non-transitory computer readable medium may store instructions for extracting a characteristic of the scribble and selecting a scribble-selected media editing command to be applied on the group of media entities if the scribble-selected media editing command is associated with the characteristic of the scribble.

The non-transitory computer readable medium may store instructions for extracting characteristics of the scribble; selecting a selected set (family) of scribble-selected media editing commands in response to a first characteristic of the scribble; and selecting out of the selected set a selected scribble-selected media editing command to be applied on the group of media entities in response to a second characteristic of the scribble.

The second characteristic is responsive to a content of at least one media entity of the group of media entities.

The non-transitory computer readable medium may store instructions for extracting characteristics of the scribble; selecting a selected set of scribble-selected media editing commands in response to a first characteristic of the scribble; presenting to a person media editing commands that belong to the selected set; and receiving from the person the selection parameter.

The non-transitory computer readable medium may include receiving an editing theme; and wherein the media editing commands comprise at least one scribble-selected media editing command that is selected in response to the scribble and to the editing theme.

The non-transitory computer readable medium may store instructions for segmenting the scribble to scribble segments, searching for a match between each scribble segment and a predetermined scribble segments associated with scribble-selected media editing commands, and selecting a scribble-selected media editing command to be applied on the group of media entities if the scribble-selected media editing command is associated with a predetermined scribble segments that matches one of the scribble segments.

The non-transitory computer readable medium may store instructions for extracting a characteristic of the scribble and selecting a selected scribble-selected media editing command to be applied on the group of media entities if the selected scribble-selected media editing command is associated with the characteristic of the scribble.

The non-transitory computer readable medium may store instructions for extracting a first characteristic and a second characteristic of a set of scribbles, the first characteristic is indicative of a target media entity of the group of media entities and the second characteristic is indicative of an effect to be triggered by the target media entity; and applying a media editing command that applies the effect when triggered by the target media entity.

The non-transitory computer readable medium may include receiving a set of scribbles; and applying at least one media editing commands on the group of the media entities to provide a media stream, wherein the media editing commands comprise at least one scribble-selected media editing command that is selected in response to a combination of at least two scribbles of the set of scribbles.

There may be provided a method for scribble based editing, the method may include receiving a group of media entities; receiving a scribble; and applying media editing commands on the group of the media entities to provide a media stream, wherein the media editing commands comprise at least one scribble-selected media editing command that is selected in response to the scribble.

The method may include searching for a match between a scribble and a predetermined scribble associated with scribble-selected media editing commands, and selecting a scribble-selected media editing command to be applied on the group of media entities if the scribble-selected media editing command is associated with a predetermined scribble that matches one of the scribble segments The searching for a match may include applying a descriptor based matching algorithm.

The searching for a match may include applying a shape based matching algorithm.

The method may include extracting one or more characteristics of the scribble and selecting the at least one scribble-selected media editing command in response to the one or more characteristics of the scribble.

The method may include extracting a characteristic of the scribble and selecting a scribble-selected media editing command to be applied on the group of media entities if the scribble-selected media editing command is associated with the characteristic of the scribble and is not associated with any of the predetermined scribbles.

The method may include extracting a characteristic of the scribble and selecting a scribble-selected media editing command to be applied on the group of media entities if the scribble-selected media editing command is associated with the characteristic of the scribble.

The method may include extracting characteristics of the scribble; selecting a selected set of scribble-selected media editing commands in response to a first characteristic of the scribble; and selecting out of the selected set a selected scribble-selected media editing command to be applied on the group of media entities in response to a second characteristic of the scribble.

The second characteristic may be responsive to a content of at least one media entity of the group of media entities.

The method may include extracting characteristics of the scribble; selecting a selected set of scribble-selected media editing commands in response to a first characteristic of the scribble; presenting to a person media editing commands that belong to the selected set; and receiving from the person the selection parameter.

The method may include receiving an editing theme; and wherein the media editing commands comprise at least one scribble-selected media editing command that is selected in response to the scribble and to the editing theme.

The method may include segmenting the scribble to scribble segments, searching for a match between each scribble segment and a predetermined scribble segments associated with scribble-selected media editing commands, and selecting a scribble-selected media editing command to be applied on the group of media entities if the scribble-selected media editing command is associated with a predetermined scribble segments that matches one of the scribble segments.

The method may include extracting a characteristic of the scribble and selecting a selected scribble-selected media editing command to be applied on the group of media entities if the selected scribble-selected media editing command is associated with the characteristic of the scribble.

The method may include extracting a first characteristic and a second characteristic of a set of scribbles, the first characteristic is indicative of a target media entity of the group of media entities and the second characteristic is indicative of an effect to be triggered by the target media entity; and applying a media editing command that applies the effect when triggered by the target media entity.

The method may include receiving a set of scribbles; and applying at least one media editing commands on the group of the media entities to provide a media stream, wherein the media editing commands comprise at least one scribble-selected media editing command that is selected in response to a combination of at least two scribbles of the set of scribbles.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
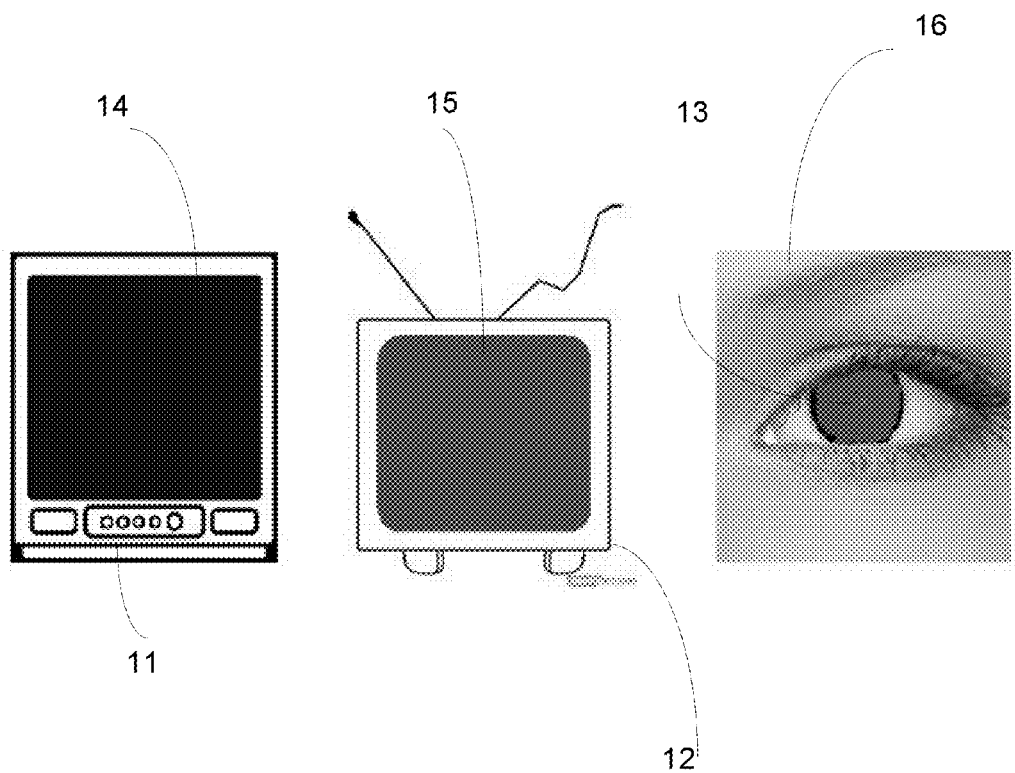
FIG. 1 illustrates video presentation frames according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The illustrated methods, systems and computer program products may provide a comprehensive solution to the problems of browsing, searching editing and producing personal video, by utilizing automatic image and video content analysis. In contrast to previous related art, the methods, systems and computer program products may identify all the required aspects of the problem and thereby provides a complete solution.

Any reference to a method should be interpreted as a reference to a system and additionally or alternatively as a reference to a computer program product. Thus, when describing a method is it noted that the method can be executed by a system or by a computer that executes instructions of the computer program product.

Any reference to a system should be interpreted as a reference to a method executed by the system and additionally or alternatively as a reference to a computer program product. Thus, when describing a system is it noted that the system can execute a method or can execute instructions of the computer program product.

Any reference to a block can include a reference to a hardware block, a software block or a stage of a method.

Scribble Based Video Editing

One of the main challenges of semi-automatic video editing is to allow users to contribute without having any technical skills or even general know-how around video editing.

There is provided a description of a personalized video editing application that is based on the user's scribbles and drawings. This user experience is most natural while applied on a Tablet or a Smartphone accompanied with a Stylus. It combines complex and creative user control with a fun user experience.

The suggested solution turns each scribble into a graphical element (such as visual effects or transitions) that will be applied on the edited video. Other drawing types, such as hand-written text or sketches, can also be integrated into the edited movie in order to increase the personalization of the video and the involvement of the user in the video editing process.

The term "scribble-selected media editing command" is a media editing command that is selected, at least partially, based on a scribble, a portion (or fragment) of a scribble, a sketch, a portion of a sketch, a characteristic of a scribble, a characteristic of a portion of a scribble, a characteristic of a sketch, a characteristic of a portion of a sketch. Once executed the scribble-selected media editing command may change one or more media unit. The following text may refer to a scribble-selected media editing command as an editing command or an appliance of an editing operation on a media entity. Scribble based video editing involves applying one or more scribble-selected media editing command.

A characteristic of a scribble may include a parameter of the scribble, an attribute of the scribble or any type of information that describes the scribble.

The scribble based video editing described in this paper can be integrated with an automatic (or semi-automatic) video editing system, such as the one described in U.S. patent application Ser. No. 13/041,457 which is incorporated by reference.

Section 1: Movie Framing

One type of scribble based video editing is by drawing the frame in which the video will be played in such as in the examples shown in FIG. 1. In this example, the framing (14 and 15) of the edited video will be taken from the user's sketch (a sketch of a TV in these examples—11 and 12), and the region in which the video will be played is determined by a marked region that corresponds to the screen of these TVs. The scribble-selected media editing command once executed will assist in causing the video to be displayed within the region.

The shape of this region is not necessarily a rectangle—in FIG. 1 (elements 11, 12 and 13 including regions of display of video 14, 15 and 16) the region is a rounded shape (it can also be an arbitrary shape). In addition, the frame does not have to be a sketch but also a picture, such as a picture of an eye 13 wherein the video is displayed within a region that corresponds to the pupil 16 of the eye. In this example the movie will be played inside the pupil of the eye, and the rest of the picture will stay static.

Figure 2:
FIG. 2 illustrates video presentation frames according to an embodiment of the invention.
Figure 2:
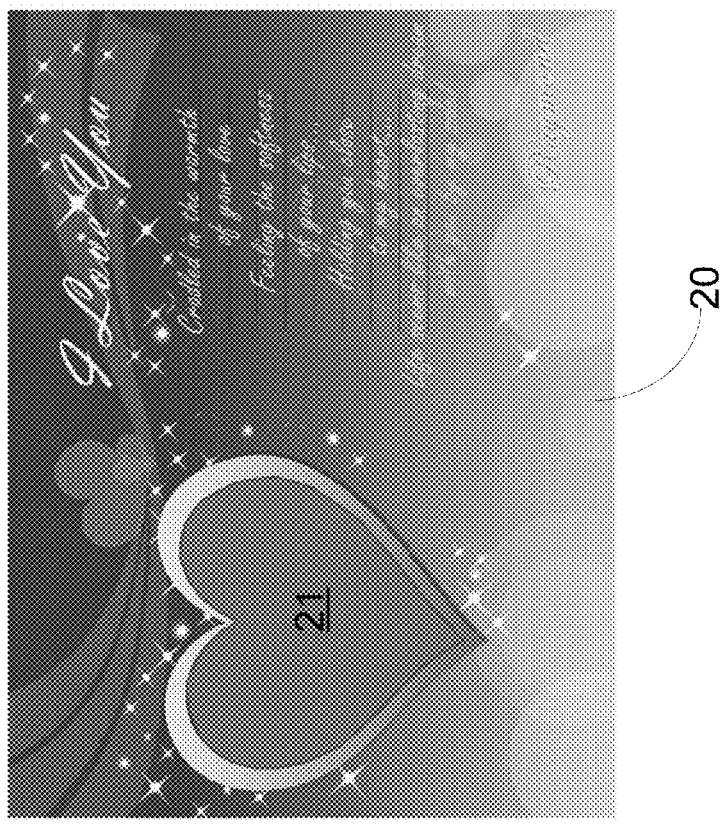

The variety of applications that can be implemented using the movie-framing effect is infinite. For example—creating a greeting card that contains a region in it in which the video is being played. This application is demonstrated in FIG. 2 The user selects a designed card 20 (he can select any picture) and marks the area in which the video 22 should be played in (in this case—the heart 21). This effect (a still sketch or a draw that surrounds a dynamic video) can be applied not only to the whole video but also to parts of it (e.g.—the beginning of an edited video, in this case the video starts inside the frame, and expands to a full screen by zooming).

Section 2: Free Style Sketches & Text

The user can add free style text or arbitrary sketches to the edited video simply by scribbling it on the screen. The user can also define its own signature or logo that will always be used when the videos are being edited. The text, signature or logo will appear at the beginning or the end of each edited video or can be combined with a pre-defined graphical asset (e.g.—effect), making this asset personalized.

Figure 4:
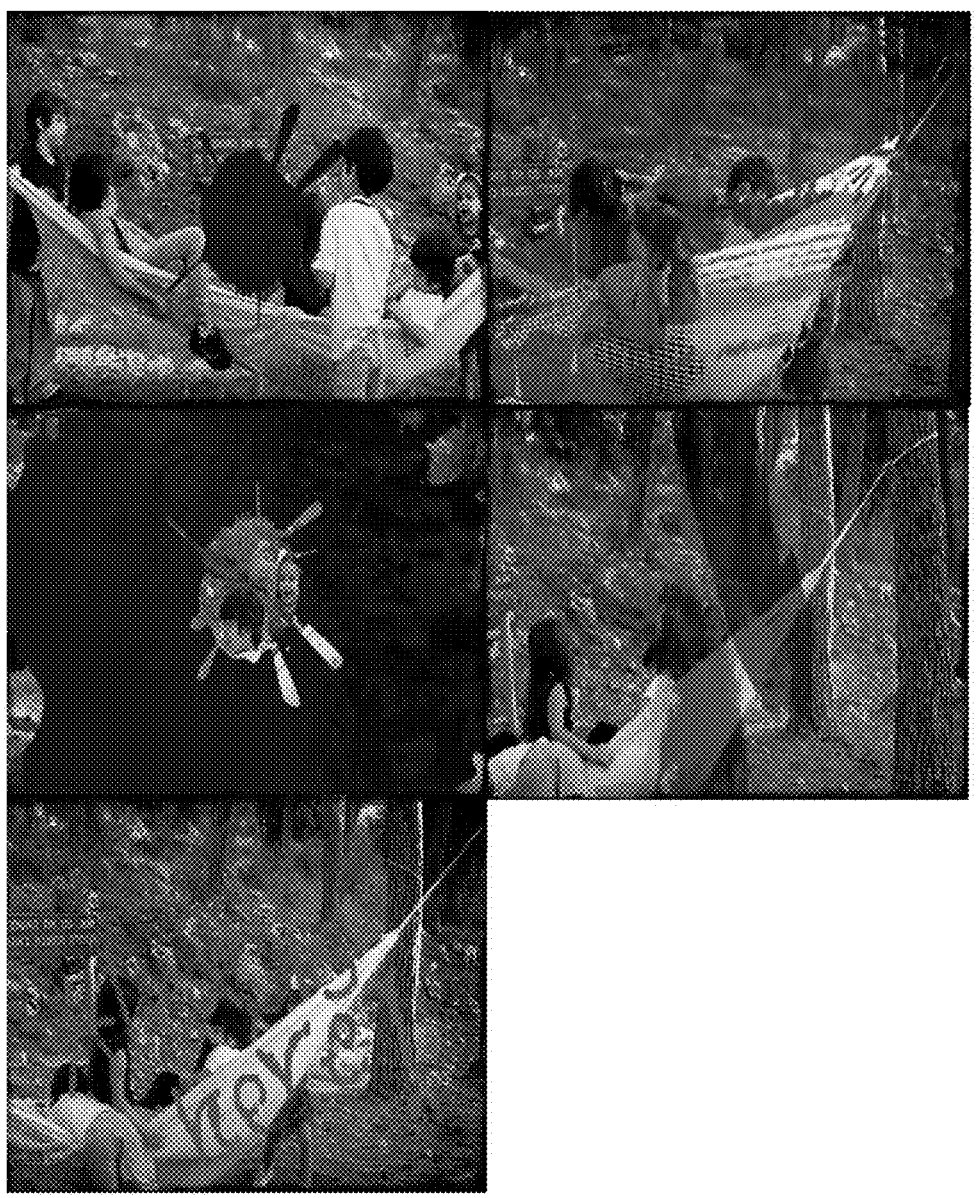
FIG. 4 illustrates images and scribbles according to an embodiment of the invention.

The user might be able to add free-style text or sketches to other parts of the video. The text may appear unchanged, or it can be placed in the video in various ways (e.g. as shown in FIG. 4—text appears in image 45).

Optionally, the sketches can be used as an input for a pre-defined graphical effect. Using the user scribbles as an input to the effect makes it personally customized to the user.

For example, consider the following effect which emphasizes a region of interest in the frame 142. In this effect, a detected region of interest (e.g.—a detected person) 144 is kept unchanged, while the rest of the area is decorated with duplications of the scribble drawn by the user, in various sizes (or colors). This effect is demonstrated in FIG. 14. The user sketch 141 (a star) is used as an input for a graphical asset that draws duplications of the sketch 145 on top of background areas to emphasize the region of interest 144. The scribble-selected media editing command once executed will assist in generating the mentioned above effect.

Section 3: Scribbles Based Video Production

The suggested solution turns each scribble into a graphical element (such as visual effect or transition) that will be applied on the edited video. The scribble-selected media editing command once executed will assist in accomplishing the visual effect or transition. Other drawing types, such as hand-written text or sketches can also be integrated into the edited movie in order to increase the personalization of the video, and increase the involvement of the user in the video editing process.

The production of the video is the graphic packaging of the video, which includes transitions, effects and any other graphical element.

This production can be controlled by the user via his scribbles and sketches. The scribbles and sketches may result in a selection of a scribble-selected media editing command.

The scribbles can be drawn in real-time or be selected from a bank of scribbles stored on the user computer (e.g.—My-Scribbles folder). The user might select a scribble from a library and modify it to get a new scribble.

In an alternative implementation, there is a pre-defined collection of shapes and sketches that are selected by finding the one that is most similar to the sketch drawn by the user (This can be done in a similar way to the way written letters are recognized from user hand written text using various OCR method—Plamondon, R. E. (2000). Online and off-line handwriting recognition: a comprehensive survey. IEEE Transactions Pattern Analysis and Machine Intelligence, Vol 22, (pp. 63-84)).

Figure 3:
FIG. 3 illustrates scribbles according to an embodiment of the invention.
Figure 3:
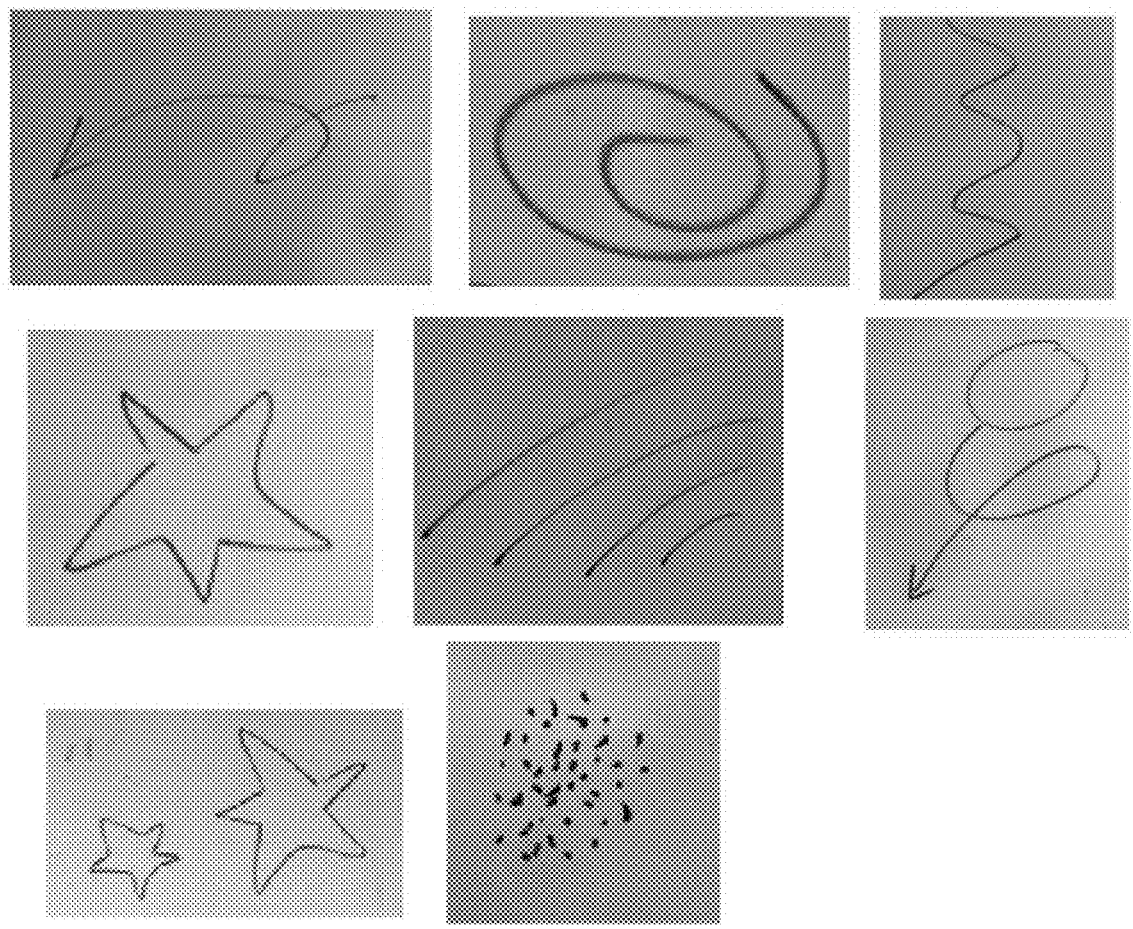

Some scribbles are demonstrated in FIG. 3. One scribble might have several interpretations, which can result in various effects.

FIG. 3 includes examples for schematic scribbles, and their optional interpretation (an example of a mapping between scribbles and scribble-selected media editing commands).

Scribble 31—A motion-based transition (e.g.—exit effect where the previous clip exits the frame according to the motion of the scribbled line).

Scribble 32—An image rotation effect or transition.

Scribble 33—Split transition, where the split is determined according to the scribbled shape.

Scribble 34—Zoom-in transition, where the previous clip disappears according to the scribbled shape.

Scribble 35—A "Strobe" effect (eliminating each $k^{th}$ frame from the video. This effect, when synchronized to the beat of the music, is frequently used in music clips).

Scribble 36—A more complex transition. E.g.—a combined zoom-in (starting from a circle) with motion (according to the curve of the line).

Scribble 37—Two sketches, indicating a star-shape zoom-in transition (the two scribbles indicates the starting and ending shapes of the transition).

Scribble 38—Dissolve transition (the type and duration of this transition can be determined from the density or diameter of the draw).

The scribbles are automatically analyzed by the engine, determining their interpretation and/or parameters. The analysis can use various computer vision algorithms for shape matching, for example, using the method illustrated in Mori G., B. S. (2005). Efficient Shape Matching Using Shape Contexts. IEEE Transactions on Pattern Analysis and Machine Intelligence, vol. 27, no. 11, (pp. 1832-1837).

For example, scribble 32 can be automatically identified as a spiral, and its size and density can set the parameters for the appropriate visual effect.

Another way to identify the type of the scribble is by using one of many image classification methods that exist in the literature (E.g. Oren Boiman and Eli Shechtman and Michal Irani (2008). "In defense of Nearest-Neighbor Based Image Classification." CVPR. 2008). For example, a spiral sketch can be recognized by classifying it to one of 'spiral' set of images, and 'non-spiral' set of images (consisting of various scribbles that are not spiral).

The type of the scribble can be automatically determined using an automatic analysis of the scribble (e.g.—a zoom-in transition in case the shape is a closed curve, or an opening transition if the shape is an open curve, etc') or it can be proactively selected by the user (in this case the interpretation of the scribble depends on the scribble-type that was selected by the user), or a combination of both.

In any case, a single scribble may have several interpretations. The specific interpretation used in the editing process can be selected randomly, or according to the context of the video (taking into account other video-editing considerations).

Figure 14:
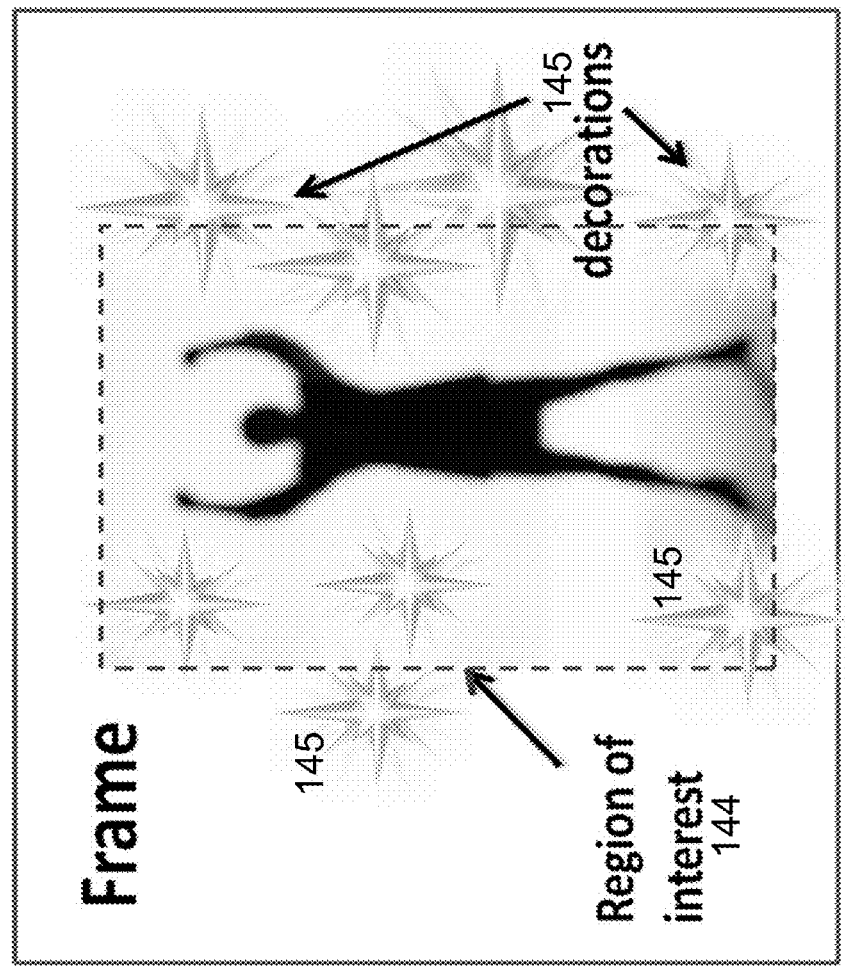
FIG. 14 illustrates an original image, a scribble and an animated image according to an embodiment of the invention.
Figure 14:
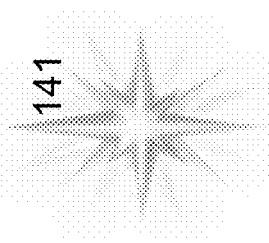
Figure 14:
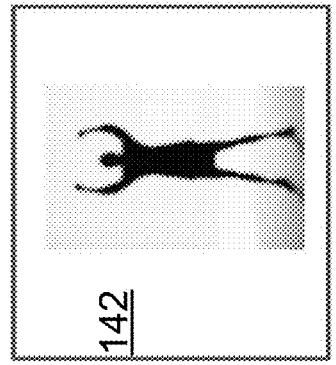

For example—a circle can be interpreted as an instruction (a scribble-selected media editing command) for a zoom effect, and also used as a free-style sketch in various effects, such as the one shown in FIG. 14.

The appearance and style of the graphical elements can also depend on the theme (editing style) of the edited video as demonstrated in FIG. 4.

FIG. 4 illustrates a Stylized effects—the user's scribbles, together with a pre-determined style are combined (by executing at least one scribble-selected media editing command) into the original video footage to create a stylized visual effect—as illustrated in images 41-44. In this way, the user can create an infinite number of visual effects in the edited video, all having a professional appearance. In a similar way, the user can create stylized text (by drawing text instead of an arbitrary scribble).

The user can select a number of scribbles. In this case, the system can apply several transitions or effects from this set of scribbles in the edited video.

In addition, the user can draw multiple scribbles in a single drawing: These multiple scribbles might be automatically analyzed by the system, to determine their mutual interpretation. For example, the interpretation of scribble 37 might be: a zooming effect, starting from the shape corresponding to the left scribble and ending in the right one. The exact parameters of this zoom effect might also be automatically determined by the scribbles using algorithms of morphological matching (e.g. using the algorithm in Mori G., B. S. (2005). Efficient Shape Matching Using Shape Contexts. IEEE Transactions on Pattern Analysis and Machine Intelligence, vol. 27, no. 11, (pp. 1832-1837)).

A simple case of automatically modifying the user's scribble in order to adjust it to the edited video is by changing its color—for example, selecting a color that better suites the content on top of which the scribble is added.

One type of visual effects that can be generated from user scribbles is animated-scribbles. The user draws (or selects) one or a set of scribbles, and these scribbles are automatically transformed into a dynamic animation.

Another example is part-based animation:

Segment the scribble into several parts, for example using simple color clustering of the pixels or by detecting connected components.

Optionally, for each part, determine an anchor—for example, being the mid-point of each segmented part, or a point in the intersection with other parts.

Apply a different simulated motion for different parts (e.g.—rigid transformation). If anchor points are chosen, the simulated motion will keep the anchor points stationary.

Figure 12:
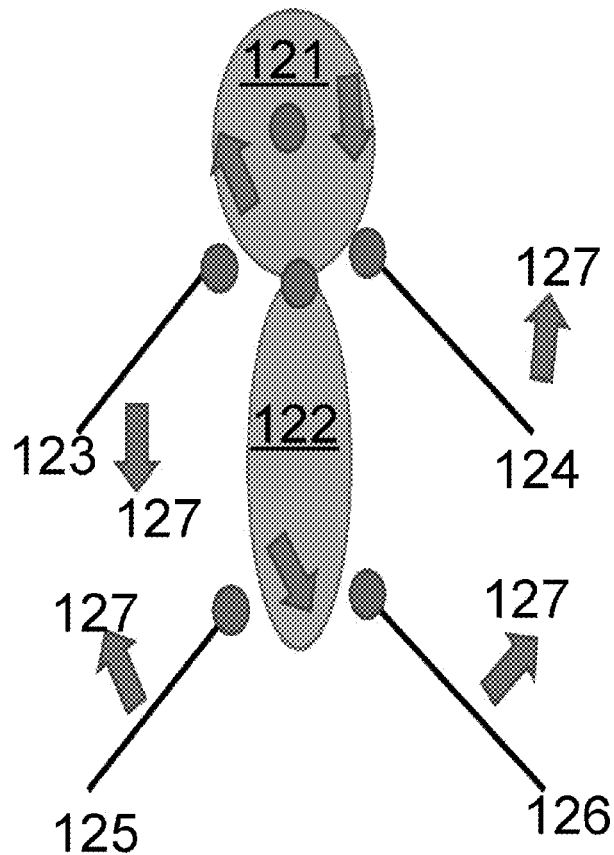
FIG. 12 illustrates a scribble-based effect according to an embodiment of the invention.
Figure 13:
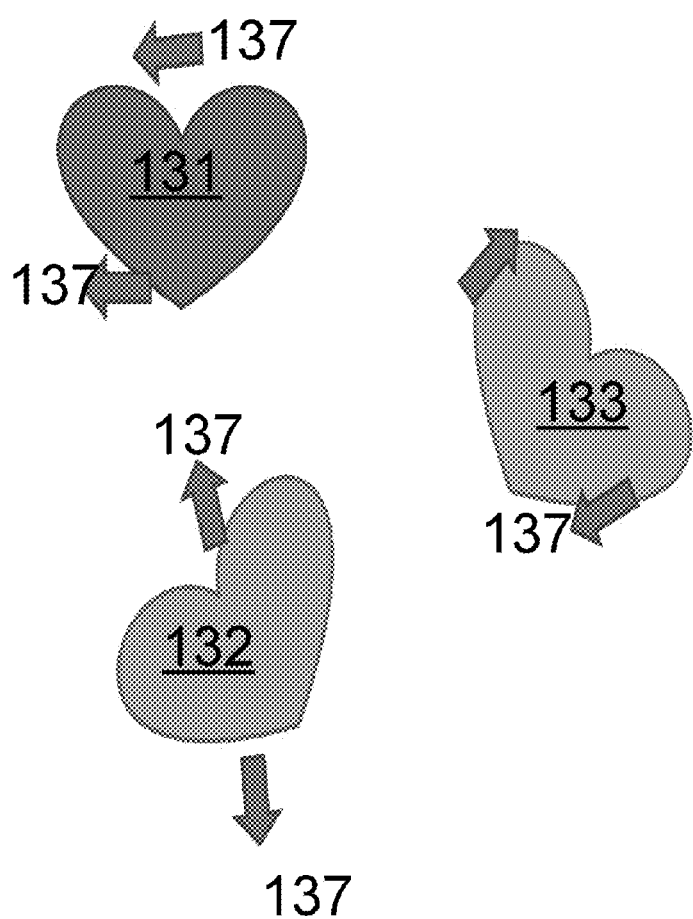
FIG. 13 illustrates a scribble-based effect according to an embodiment of the invention.

This example is demonstrated in FIGS. 12-13.

FIG. 12 illustrates a "dancing man" animation 120 the scribbled man seems to be dancing due to the movement (denoted by arrows 127) of his organs (head 121, main body 122, hands 123 and 124 and legs 125 and 126).

FIG. 13 illustrates "Particles" animation: the user scribble consists of several hearts 131, 132 and 133, and these hearts are segmented automatically and attached with different animations. Alternatively, a similar effect can be obtained by duplicating the same sketch (e.g.—a single heart) and applying different transformations heart to different instances of this sketch—up and down arrows 137 associated with heart 132, left movement arrows 137 associated with heart 131 and left and right arrows 137 associated with heart 32.

Another example for animated scribbles is morphing: given two similar scribbles, an animation is being created by generating a set of intermediate scribbles, for example using an interpolation of the color values or by morphing the shapes.

Another example for animated scribbles is a gradual appearance of a drawn text: assuming that a text is detected in the scribble (using, for example, H. Chen, S. Tsai, G. Schroth, D. Chen, R. Grzeszczuk, and B. Girod (2011), "Robust text detection in natural images with edge-enhanced maximally stable extremal regions", IEEE International Conference on Image Processing (ICIP), September 2011), it can be automatically separated to its different letters, and then it can be shown on top of the video using an effect that displays each letter sequentially—each time adding a new letter.

Section 5: Context-Based Scribbles

An additional valuable functionality can be achieved by using context-based scribbles. These scribbles consist of multiple objects or shapes, in which the first object indicates the context, and the second object represents the visual element. One example is a sketch of a face (e.g.—A "Smiley") together with another sketch such as a thought-bubble. This combination of sketches will be recognized by the editing engine as a graphical element that should be applied when faces are detected in the video. Some examples of context-based scribbles are shown in FIG. 5.

Figure 5:
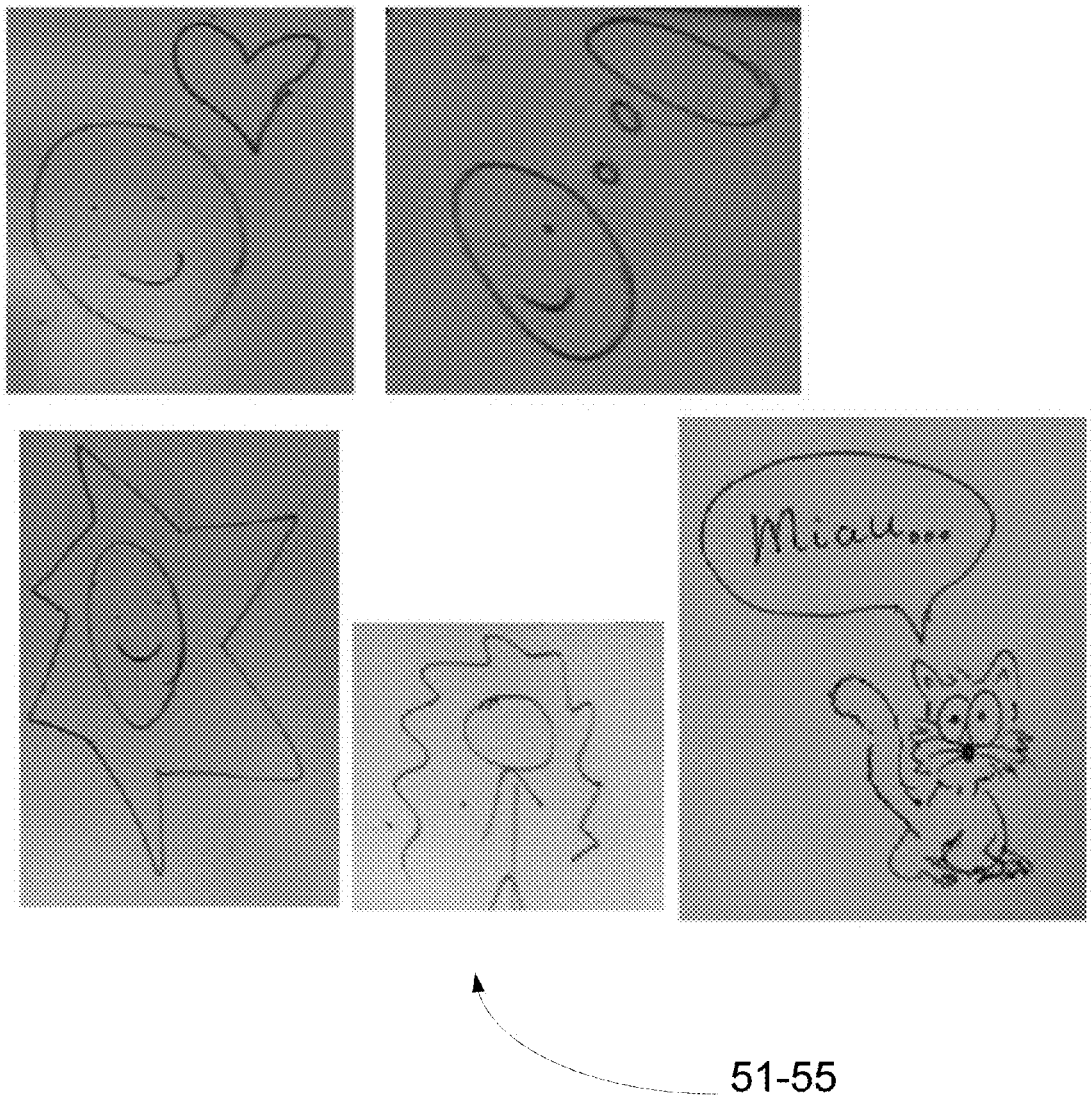
FIG. 5 illustrates scribbles according to an embodiment of the invention.

FIG. 5: Context-based effects using scribbles. A possible interpretation of the scribbles above might be:

Scribble 51—Add a 'heart' effect next to a face in the video (that might be detected automatically)

Scribble 52—Attach a thought-bubble to a face

Scribble 53—Do a closing-effect in a star shape around a face (the editing system can automatically apply the effect only around important faces. Such important faces can automatically be determined using algorithms such as the ones described in U.S. patent application Ser. No. 13/041,457 which is incorporated by reference).

Scribble 54—Add stylized sketches around a detected person in the video (or emphasize the person in a different way).

Scribble 55—Other objects (or visual classes) can be detected, for example—attaching a visual element to a cat (and applying it when a cat appears in the video).

To achieve visually compelling results, the graphical element attached to an object should move together with the object. This can be done using object tracking (Zdenek Kalal, J. M. (2010). P-N Learning: Bootstrapping Binary Classifiers by Structural Constraints. IEEE Conference on Computer Vision and Pattern Recognition, (pp. 49-56).

Section 6: Compound Scribbles

Complex graphical assets can be encoded using compound scribbles. A compound scribble is a set of scribbles that form together a higher level "instruction", translated to multiple effects (higher sequential or not) or to graphical assets that have higher complexity.

Compound scribbles can be marked either using a special marking (E.g.—the brackets in image 62), colors (See next section and images 61 and 63) or simply by detecting a scribble that consists of several shapes. The interpretation of the compound scribbles can be based either on special marks (indicating, for example, if the set of scribbles correspond to a sequential set of effects, or to a single complex effect), or it can be based on AI algorithms that guesses the intention of the user from the drawing itself.

It should be noted that finding the relations between different shapes in a drawing (for example—understand that the rectangle is rotating in image 62, or the car was moving in image 63) can be done using various computer vision algorithms that exists in the literature, e.g. the ones described in Mori G., B. S. (2005). Efficient Shape Matching Using Shape Contexts. IEEE Transactions on Pattern Analysis and Machine Intelligence, vol. 27, no. 11, (pp. 1832-1837).

Figure 6:
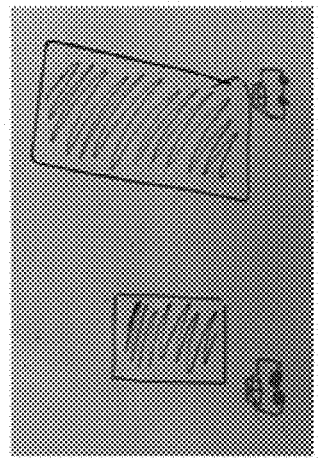
FIG. 6 illustrates scribbles according to an embodiment of the invention.
Figure 6:
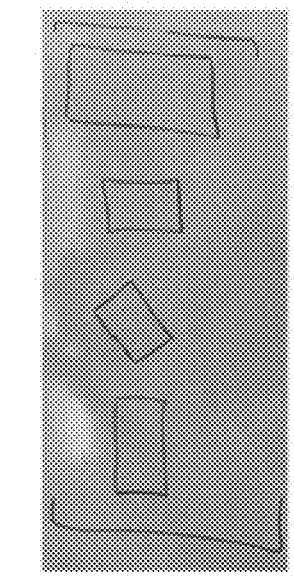
Figure 6:
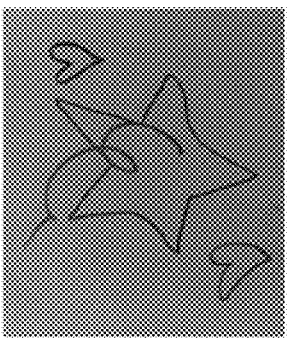

Some examples for compound scribbles are shown in FIG. 6.

Scribble 61—A color coded compound scribble: each color may indicate a different aspect of transition. A possible interpretation may be: a closing transition (with a star shape), combined with an animated motion of the frame and finally an additional layer of hearts (alternatively, the hearts can indicate the style of the transition: a "soft" style).

Scribble 62—Animation effect that starts with a rotation, and then zoom-in (according to the shape of the rectangles). In this case, the set of scribbles is a story-board that guides the evolution of the graphical asset in time. In this example, the brackets indicate that this is a compound scribble.

Scribble 63—Combined zoom effect and animation layer (the moving car).

Section 7: Scene-Related Scribbles

In case the user wishes to select the frame (in the original or in the output videos) in which the graphical element will be applied, it can be done in several ways:

Simple Scene-Related Scribbles

The user can simply mark the frame in the original footage where he wants the graphical element to be applied on. This option has a significant disadvantage that the original video may be very long and the process can be extremely tedious.

Using a Semi-Automatic Video Editing

The system automatically selects the best parts (also denoted as 'scenes') of the original footage, and displays them to the user. The user can now mark the parts in which he wants to apply the graphical element.

Figure 7:
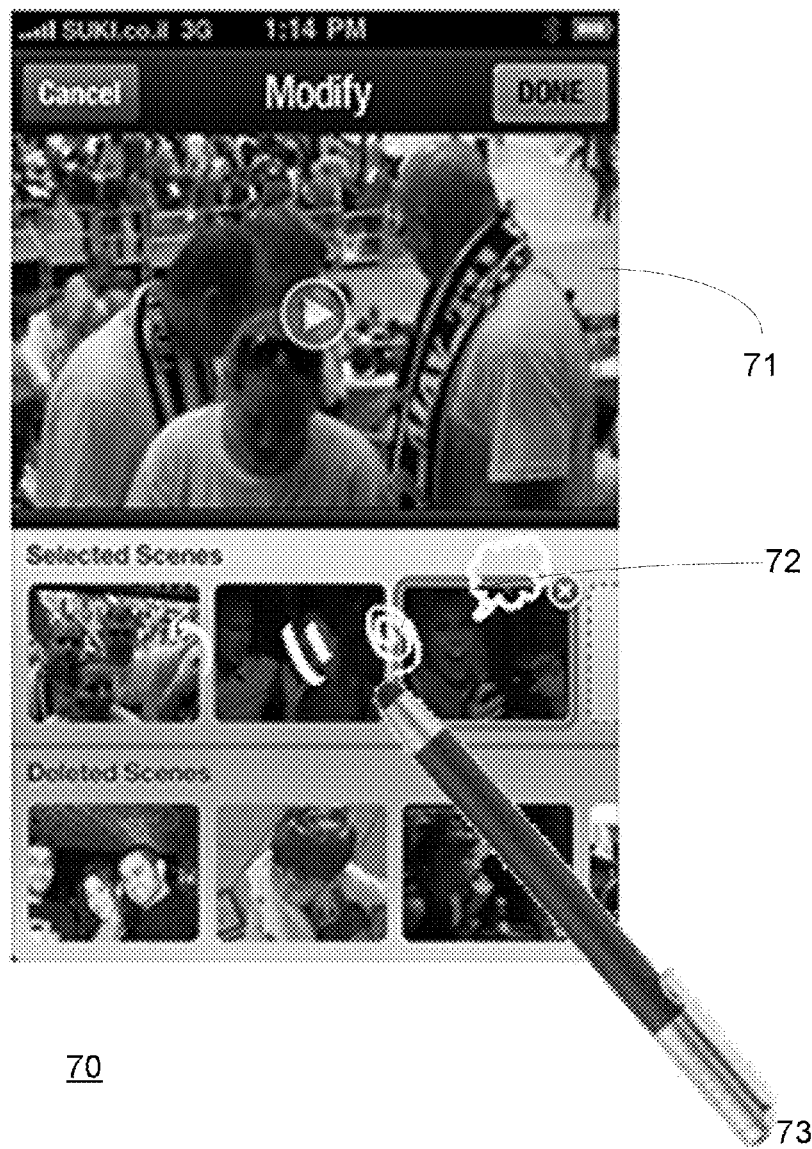
FIG. 7 illustrates a screen shot according to an embodiment of the invention.

FIG. 7: Examples of semi-automatic editing based on automatic suggestions—the user can attach graphical elements to the selected scenes. Screen 70 displays multiple regions-region 71 in which a video stream is displayed, region 72 in which the user can enter scribbles (for example by using pen 73).

The same scheme can be used to attach scribbles to specific scenes: the user simply drags the scribble (or draws it) on top of a selected scene, or between two scenes (for a transition). This mechanism is somewhat similar to the one used in Microsoft's Movie-Maker, but instead of a predetermined set of effects and transitions, the user selects or draws his own scribbles.

Having selected a frame or a scene from the video, the user can also draw on the image to direct the video editing process in a more precise way (for example—indicating the placement of the sketch, etc'). This concept is demonstrated in FIG. 8.

Figure 8:
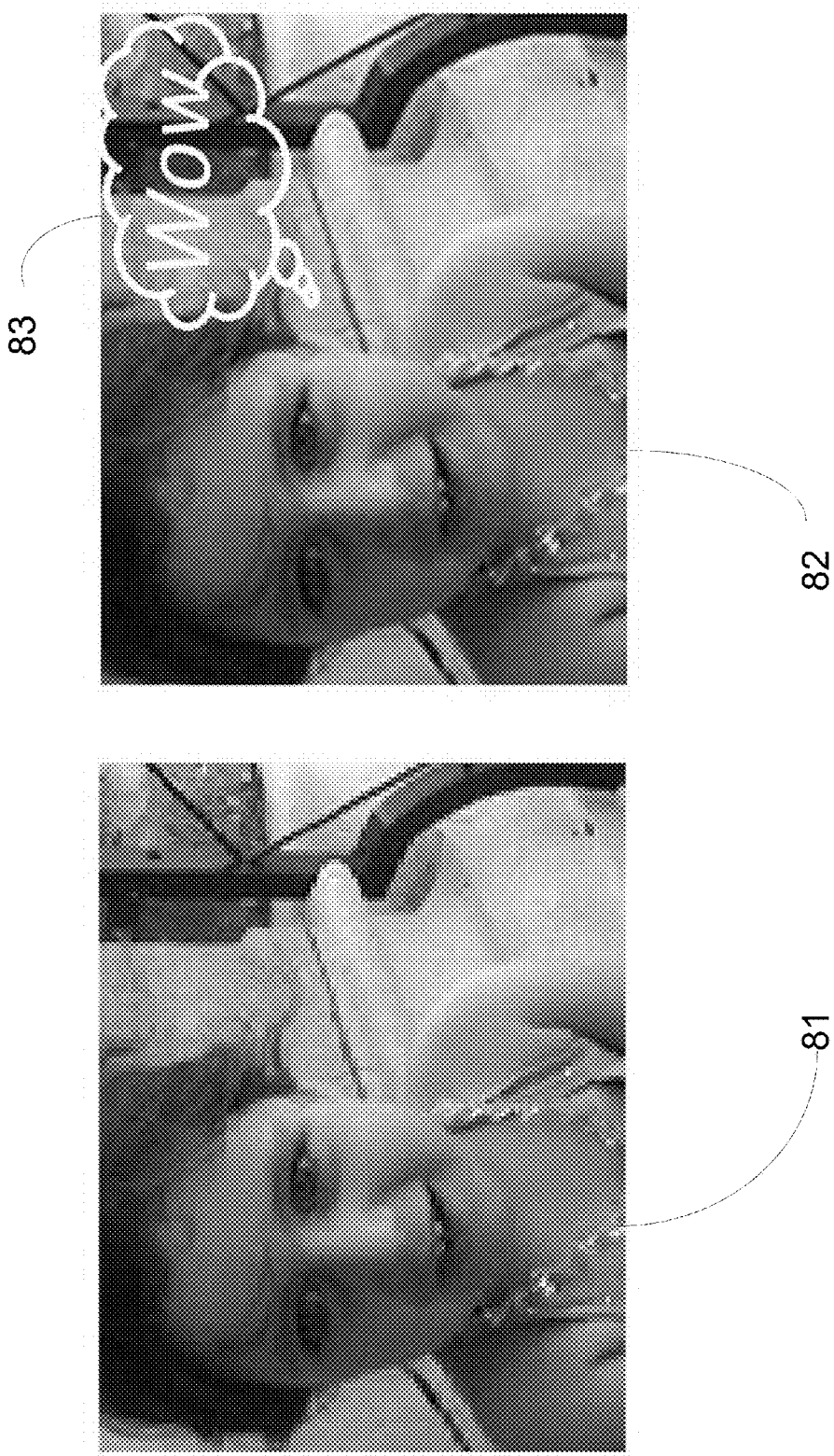
FIG. 8 illustrates two images according to an embodiment of the invention.

FIG. 8: Having selected a scene or a frame from the video (picture 81) the user can scribble on top of it. The effects corresponding to these scribbles will be applied in the appropriate position and time frame (in this case—opening the bubble with the text "Wow" 83 next to the girl's head 82).

Implicit Scene-Related Scribbles

Figure 9:
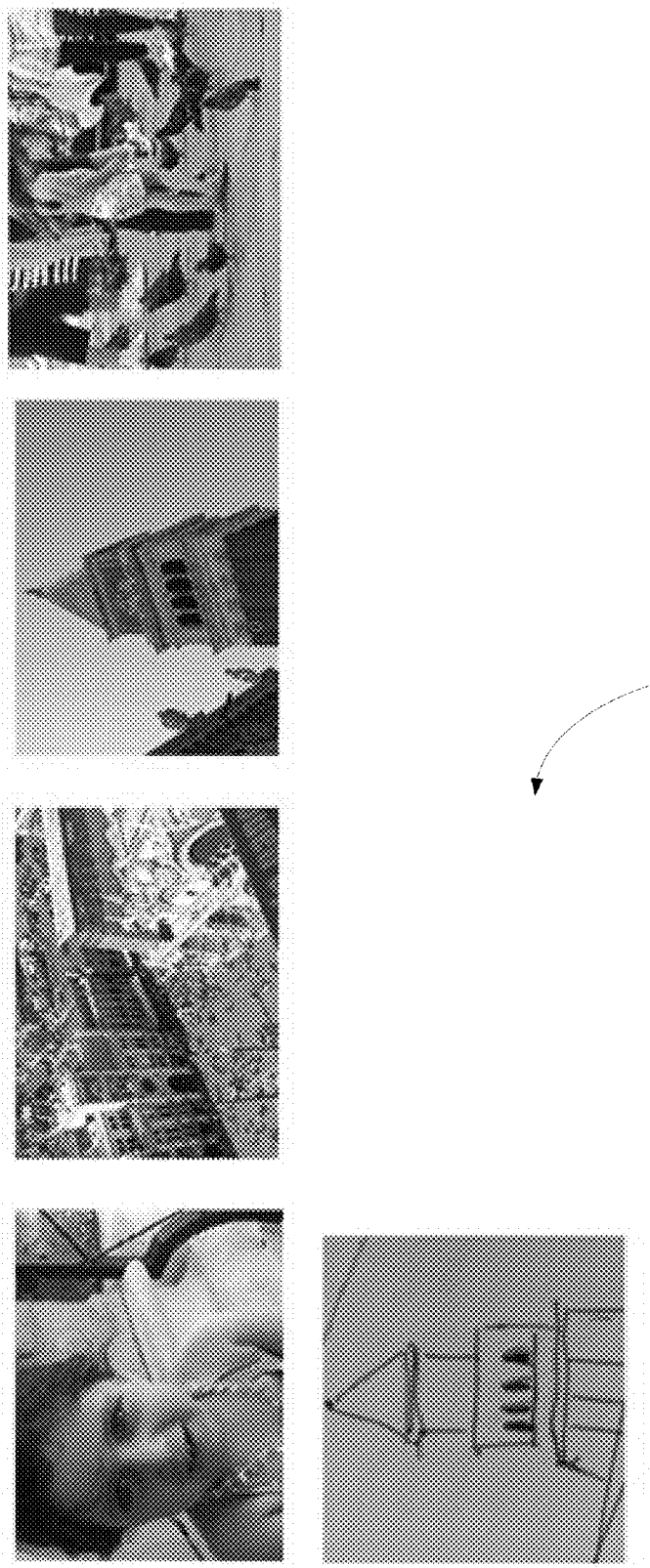
FIG. 9 illustrates four images and a scribble used to elect an image according to an embodiment of the invention.

The user can implicitly select a frame or a scene from the movie using sketching. This is demonstrated in FIG. 9: The user sketches a tower (95), and the system automatically matches this sketch with the actual scene that corresponds to it—picture 93 selected out of images 91, 92, 93 and 94. This matching can be done using various computer vision algorithms, for example, using the method described in Eitz Mathias and Hildebrand Kristian and Boube keur Tamy and Alexa Marc (2011). Sketch-Based Image Retrieval: Benchmark and Bag-of-Features Descriptors. IEEE Transactions on Visualization and Computer Graphics, Vol 17, No. 11, (pp. 1624-1636).

Section 8: Story-Board

Alternatively, the user can sketch a story board, and the application will translate his story board into a set of instructions: applying specific graphical elements in specific locations and scenes according to the user story board. This approach is mostly suitable for the semi-automatic scheme that was describe above where the user can view the selected scenes that were automatically selected by the editing system, and modify it. An example for such a story board is shown bellow.

Figure 10:
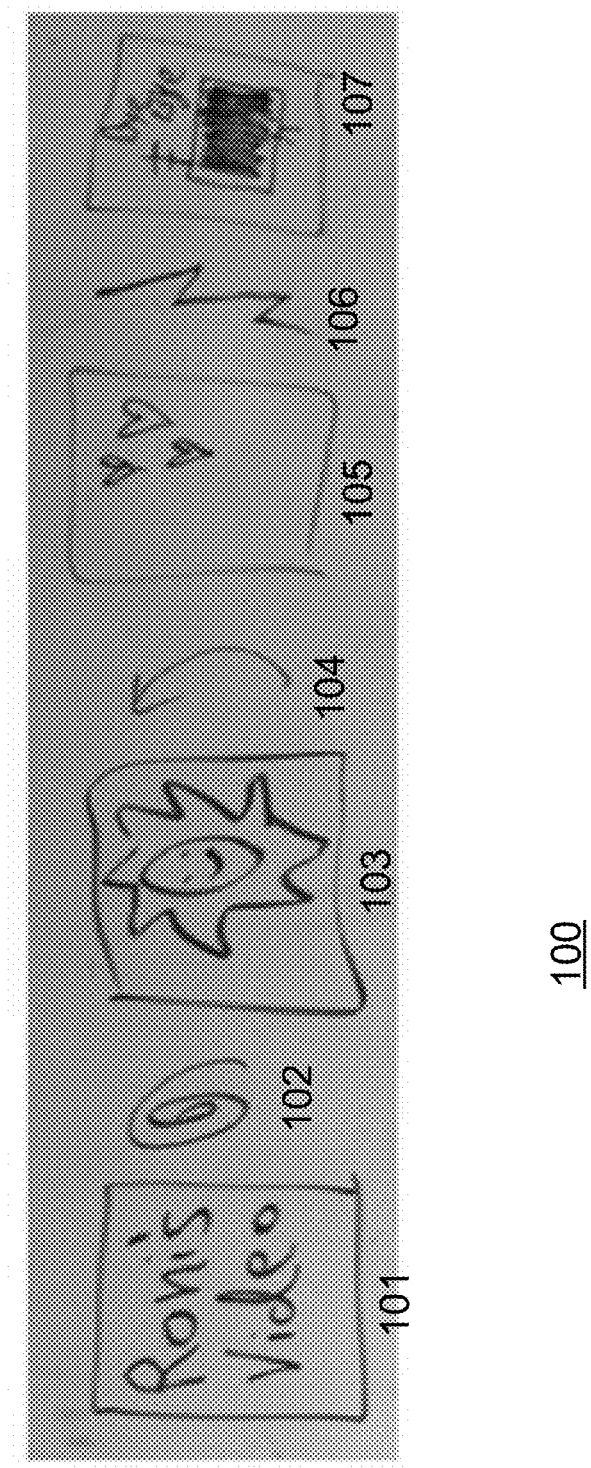
FIG. 10 illustrates a storybook that include a sequence of scribbles according to an embodiment of the invention.

FIG. 10 illustrates a story board 100 sketched by the user. The interpretation can be: start the edited video with the sketched text (scribble 101—"Roni's video"), continue with a transition of rotating frame (scribble 102 of a spiral), apply (scribble 103 of a combination of a sun and a smiling face) a context-based effect on the next selected scene (or the next scene that has a face), use a motion transition (scribble 104 of an arrow), add hearts (scribble 105 of three hearts) to one of the next scenes, use a split transition 106 (similar to 33) and finally apply a movie framing effect (see first section) where the filled area (scribble 107) indicates the region where the video is being played.

Section 9: System & Implementation

Figure 11:
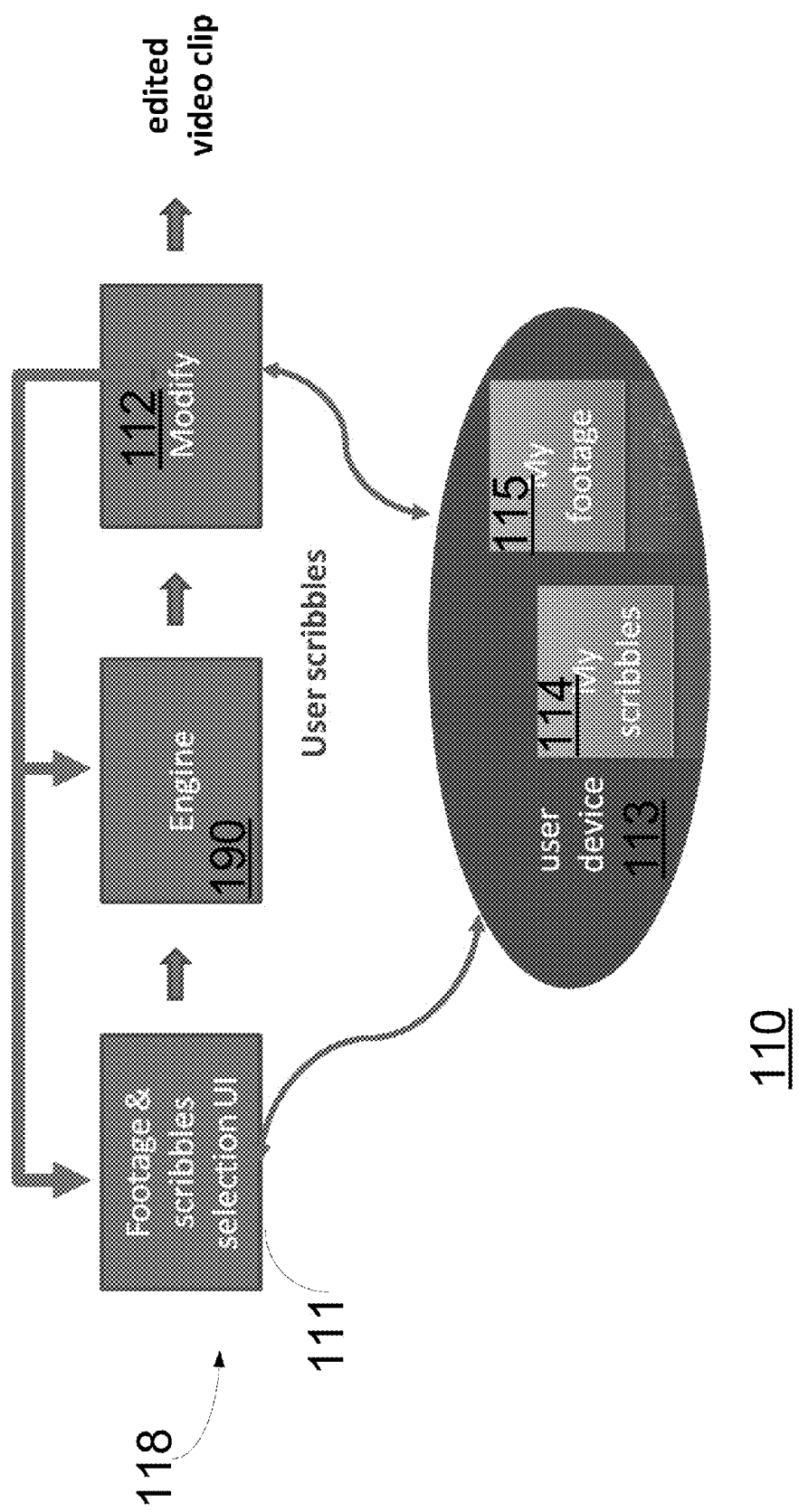
FIG. 11 illustrates a process according to an embodiment of the invention.

This section describes an optional system flow for implementing the ideas described above. A schematic diagram of such a flow is shown below FIG. 11 illustrates a schematic diagram of the system flow. It shows stages or blocks that are executed by a server 118 (or user application) that is fed from scribbles found in folders "My scribbles" 114 and from media entities found in folder "My footage" 115 of user device 113.

The blocks include Footage & Scribbles Selection UI 110, engine 190 and modify block 112.

Figure 19:
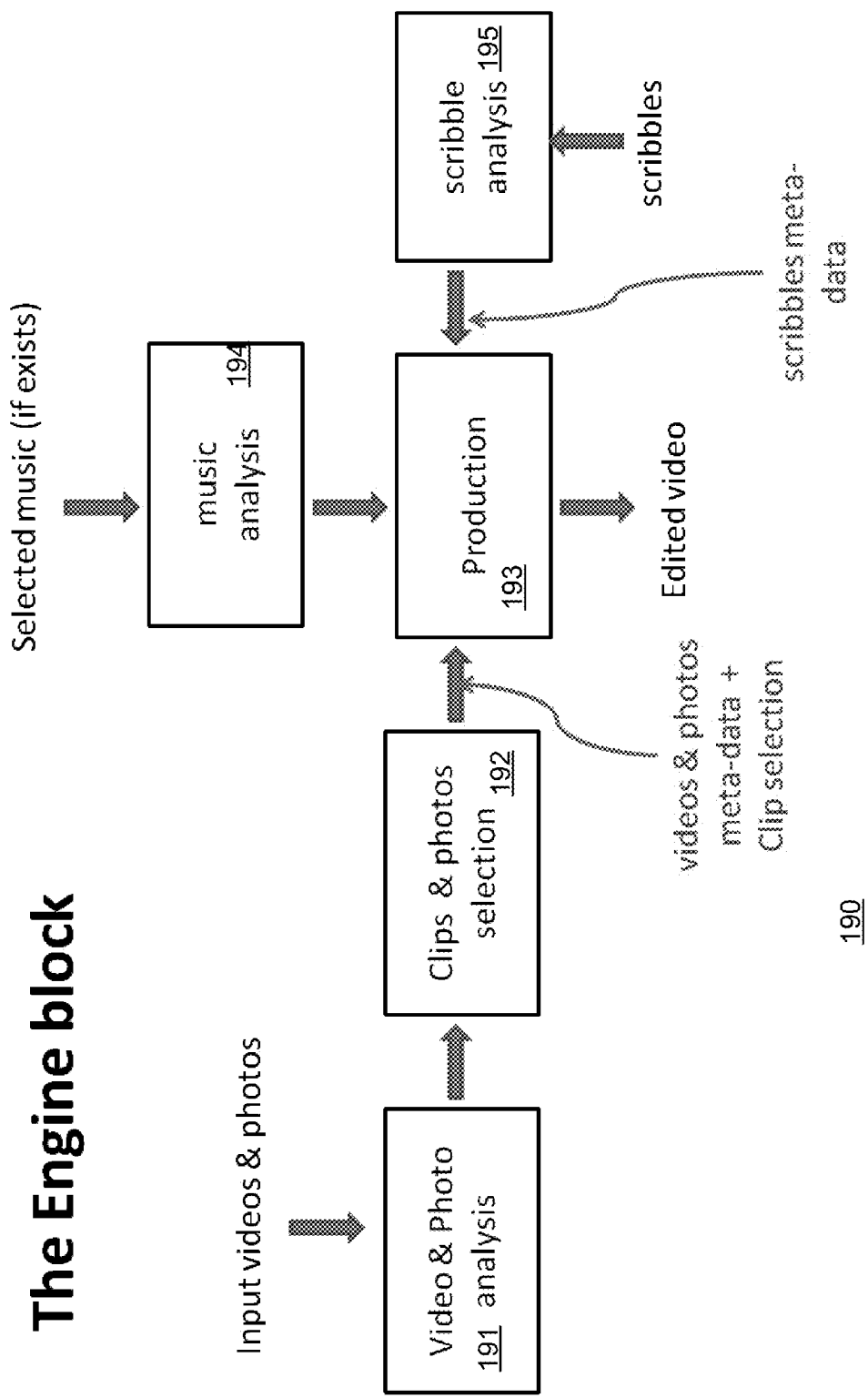
FIG. 19 illustrates an engine block according to an embodiment of the invention.

Engine 190 is discussed in FIG. 19.

The modify block 112—the user can view the selected clips and photos together with the selected effects and transitions. He can then modify the locations of the effects and transitions, as well as to delete or add new scribbles.

The implementation of this block is demonstrated in Section 8 (semi-automatic video editing).

The user modifications of the scribbles can be combined with a process of the general user modifications (e.g.— modifying the clip & photo selections or their order, changing the user preferences, etc.).

Footage & Scribbles Selection UI (110): In this block the user can capture videos and images that will be used as an input footage for the editing, or alternatively he can select existing footage.

Figure 15:
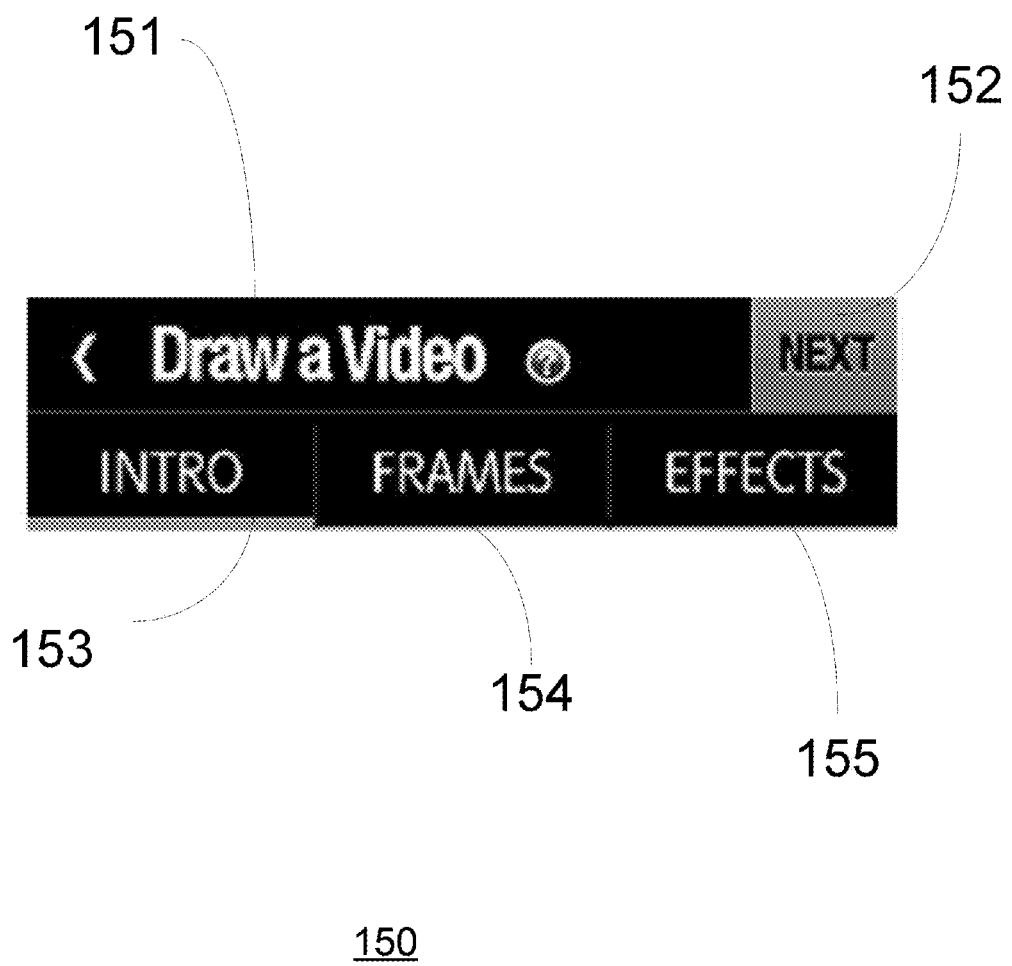
FIG. 15 illustrates a screen shot according to an embodiment of the invention.

In addition, the user can draw scribbles to guide the video editing process, or select scribbles from an existing bank (for example—selecting it from a folder 'My scribbles' that is saved on the user computer). The set of scribbles might be divided to several sub-sets, corresponding to different types of scribbles, as shown in FIG. 15. For example: scribbles that correspond to intro (or logo), scribbles that correspond to effects (155), scribbles that correspond to the framing (154) of the editing video, etc'.

Screen shots of scribble drawing & selection UI 110 are illustrated in FIGS. 15-18.

The user can select the type of the scribble. For example, in this implementation there are three types of scribbles, as shown in the screen shot: INTRO 153: a drawing that will be used as a logo or a signature in the edited video. FRAMES 154: drawing the framing around the video (See the "movie framing" caption for more details). EFFECTS 155: drawing or selecting the scribbles that will be used for the editing itself (effects and transitions).

Figure 16:
FIG. 16 illustrates a screen shot according to an embodiment of the invention.
Figure 17:
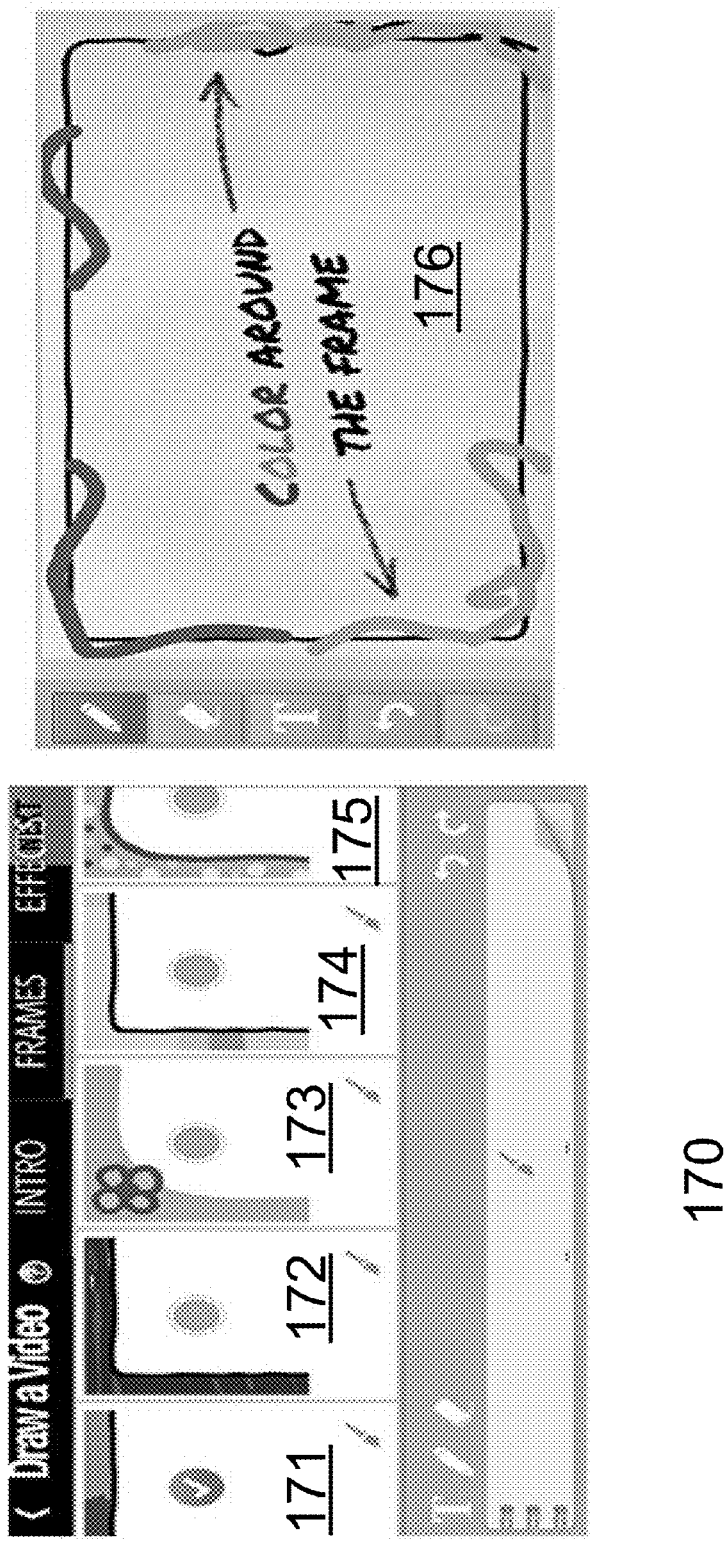
FIG. 17 illustrates a screen shot according to an embodiment of the invention.
Figure 18:
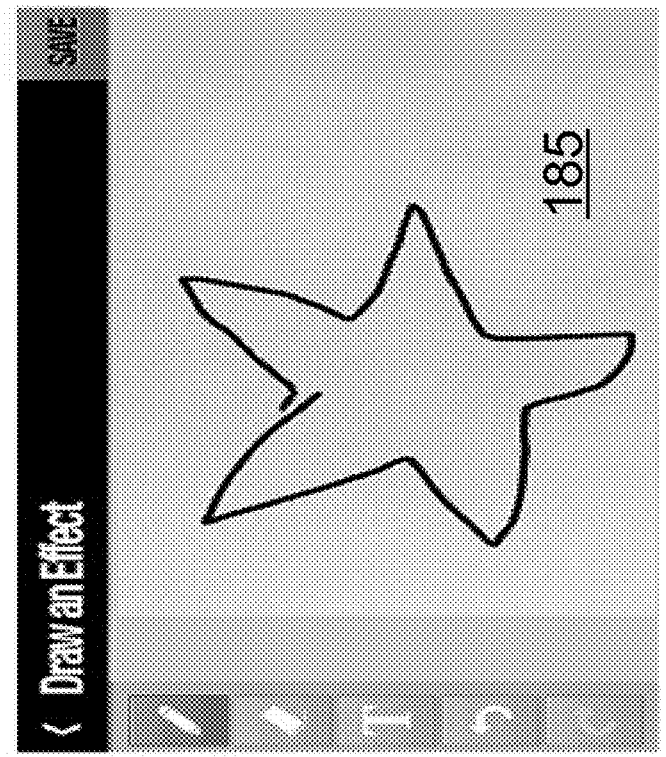
FIG. 18 illustrates a screen shot according to an embodiment of the invention.
Figure 18:
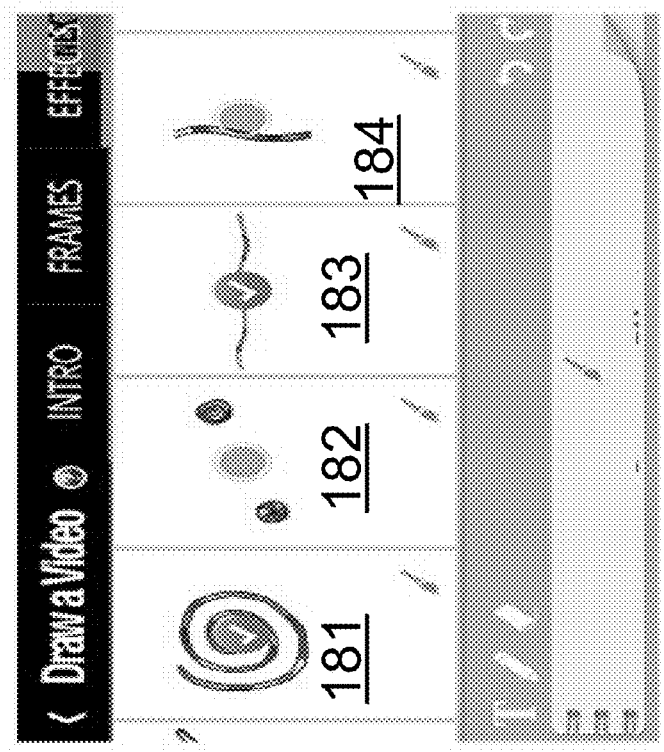

FIG. 16-18 include at their top section 150 of FIG. 15.

FIG. 16 illustrates a screen-shot 160, in which the selection is on 'INTRO', so the user can choose one of the existing intros (out of 161, 162 and 163), or he can draw a new intro of this own (in window 165). In this implementation, the intro' selection will result in an introduction that will appear at the beginning of the edited video, but in similar implementation it can be a logo or a signature as well.

FIG. 17 illustrates a selection of 'FRAMES', so the user can choose one of the existing frames (171, 172, 173, 174 and 175), or he can draw a new frame of this own (window 176) using a standard drawing user interface. The user can also edit one of the existing frames. In this implementation, the video will be occluded by the drawings (note: the text in the middle of the right figure is a guide for the user, and is not part of the scribble).

FIG. 18: In these screen-shots, the selection is on 'EFFECTS', so the user can choose several of the existing effects (181, 182, 183 and 184), or he can draw a new scribble of this own using a standard drawing interface (window 185). The user can also edit one of the existing effects.

In any case, the user drawings (plus meta-data such as the type of each scribble) are transferred to the engine. If the user selects a pre-defined scribbles, the transfer of the actual drawings can be avoided (by transferring only their identities).

Color Coding:

Color coding can be used in various ways:

a. Marking regions (e.g.—the region where the video should be played, as in the movie framing effect (FIG. 1).

b. Indicating the type of the scribble (transition, effect, motion-transition, etc').

c. Defining a layer in the sketch (e.g.—the different layers in a compound scribble, as demonstrated in FIG. 6).

When using a Stylus, the color of each scribble can be selected from a color palette.

FIG. 19 Illustrates the Engine Block.

In this block the input footage is analyzed automatically, extracting meta-data for all the input footage: including videos, photos and the user scribbles. The analysis of the video and photos can be done according to U.S. patent application Ser. No. 13/041,457 which is incorporated by reference. Based on the extracted meta-data, the best portions of the input videos are selected (denoted as the "Selected Scenes"), together with the visual elements such as the effects and transitions that uses the scribbles. The video analysis can be done either on the server or on the device.

The main components of the engine block are listed below.

Video & photo analysis 191—Analysis of the user's selected footage, including photos and videos. This analysis can be done using the method disclosed in U.S. patent application Ser. No. 13/041,457 which is incorporated by reference, and the result is a meta-data on the footage, such as: face detection & recognition, camera-motion analysis, action analysis, object detection and tracking, speech detection (and other meta-data regarding the audio component of the videos), saliency analysis, scene indexing, etc'.

Clips & photos selection 192—Selection of the best or most important portions of the videos and photos to be included in the edited video. An algorithm for estimating the importance of different parts of the video based on the extracted meta-data is described in U.S. patent application Ser. No. 13/041,457 which is incorporated by reference.

Music analysis 194—When editing a video, the user may select an accompanied music soundtrack. This soundtrack can be automatically analyzed, or it can be manually analyzed in advance. The analysis of the soundtrack is important mainly for synchronizing the transitions between clips in the edited video to the music, but it also helps in selecting visual effects and transitions during the production stage.

Scribble analysis 195—The user scribbles are also analyzed. If the user selected a pre-defined scribble, its meta-data can be computed in advance either automatically or set manually). A schematic diagram of our implementation of this step is described in FIG. 20.

Production block 193 that is fed with scribbles metadata (denoted 211 and 212 in FIG. 21) from scribble analysis 195, fed with metadata (denoted 214 in FIG. 21) from music analysis 194 and fed with metadata (denoted 213 in FIG. 21) from clip and photos selection 192 (this may include videos and photo metadata and clip selection information indicating which images are to be selected for production—images of interest).

Figure 20:
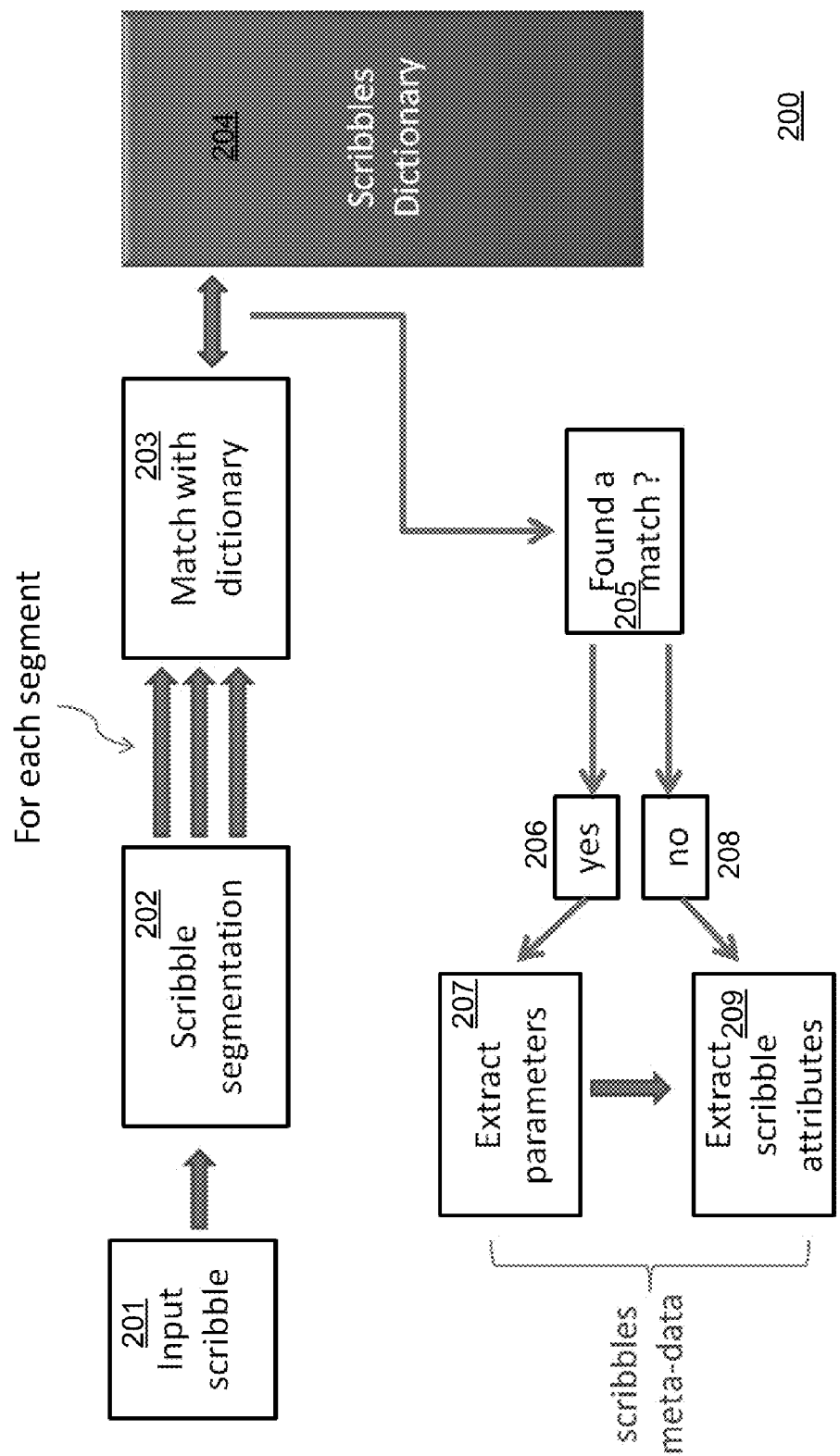
FIG. 20 illustrates a scribble analysis block according to an embodiment of the invention.

FIG. 20 illustrates the scribble analysis process 200 performed by scribble analysis 195.

The input scribbles (201), together with their available meta-data (such as the type of scribble if available) are segmented (202) to scribble-components. For example, in the example of FIG. 10, the different parts of the story-board will be extracted.

This segmentation can be done by computing connected components on the alpha channel of the scribbles, and clustering these components according to their spatial locations (i.e.—merging together components that are close to each other).

Each scribble (or scribble-component) is matched against a pre-defined dictionary (204) of scribbles. It should be noted that this matching does not require an exact fit but rather a resemblance in the characteristics of the shape of the scribble. For example—detecting a spiral in an arbitrary shape and color. Therefore, we will sometime denote a "scribble" in the dictionary as "scribble family" as it might correspond to a wide range of scribbles, all having similar characteristics.

Two main approaches that can be used for this match are: (i) Descriptor-based matching: This approach addresses the matching problem as an image classification problem: descriptors of the scribble image are extracted and matched against a descriptor-based representation of the scribble family in the dictionary. A general algorithm for descriptor-based image classification (called "NBNN") is described in Oren Boiman and Eli Shechtman and Michal Irani (2008). "In defense of Nearest-Neighbor Based Image Classification." CVPR. 2008. (ii) Shape-based matching: This approach addresses the scribble as a shape, and computes its similarity to the shapes of the scribble (or scribble families) in the dictionary. One algorithm for shape matching is described in Mori G., B. S. (2005). Efficient Shape Matching Using Shape Contexts. IEEE Transactions on Pattern Analysis and Machine Intelligence, vol. 27, no. 11, (pp. 1832-1837).

If there is a match (box 206), then the 'family' of scribbles to which this scribble belongs is known (e.g.—'Spiral') and we can use this scribble to apply an effect that is appropriate for this family of scribbles (The process of matchmaking between effects and scribble-families is described later in the production stage).

We might want to extract (207) an additional information regarding the specific parameters of this scribble (besides the facts that its belong to a given family). These parameters might be obtained directly from the matching, but they can be extracted in a post-processing. For example, if a scribble is identified as belonging to the family of 'Curved Lines' (See scribble 33) we can extract additional parameters, such as its main orientation, width, curvature, etc'.

Finally, general attributes (209) of the scribble are computed, even if there was no success (box 208) in matching this scribble to a specific family.

Some useful scribble attributes are:
1. Is it a closed shape.
2. Its diameter.
3. The mask (binary or soft) of its interior region.
4. Its bounding box.
5. Number of connected components in this scribble.
6. Its main orientation.
7. A color segmentation of the scribble.

Most of the attributes can be computed using simple known morphing and image processing algorithms.

Figure 22:
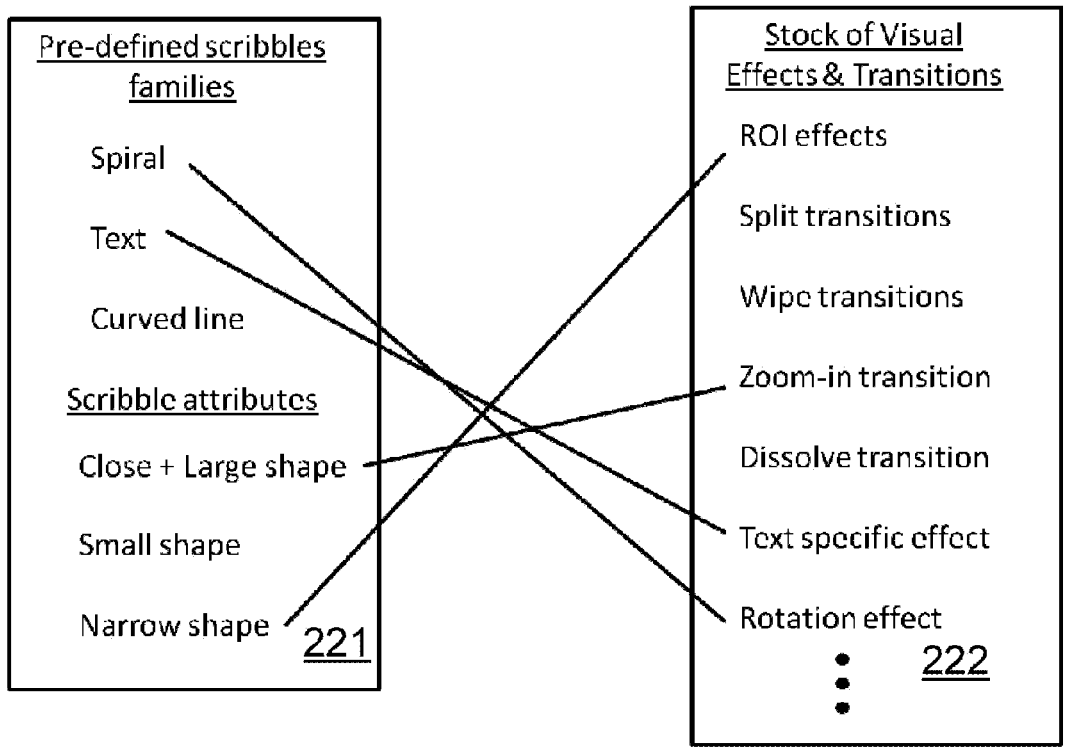
FIG. 22 illustrates a mapping between scribbles and scribbles attributes and effects according to an embodiment of the invention.

FIG. 22 illustrates a mapping between pre-defined scribble families 221 (spiral scribble, text scribble, curved line scribble and the like) and scribble attributes to visual effects 222.

Production (Denoted 193 in FIG. 19): This stage is responsible for generating an edited video, that consists of the selected clips and photos, the attached soundtrack (if given) and the visual effects and transitions (that uses of the user's scribbles).

Figure 21:
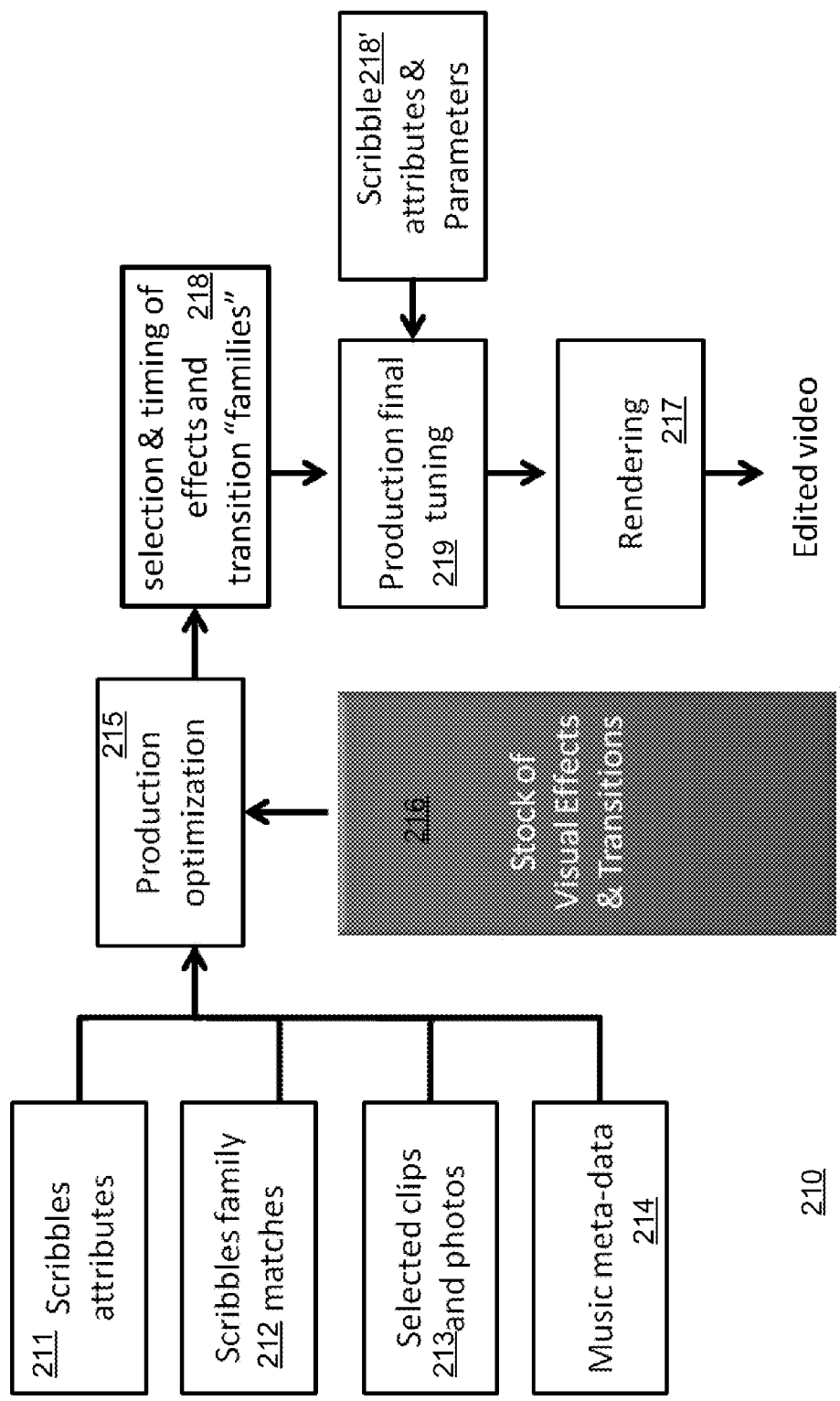
FIG. 21 illustrates a production block according to an embodiment of the invention.

An implementation of this block is described bellow in FIG. 21.

The input for this block is: (a) The selected clips and photos together with their relevant meta-data (213). The scribbles with their family-matches and their attributes (211, 212). The music meta-data (214)

In addition, this block uses a stock (216) of visual effects and transitions that consists of pre-defined families of effects and transitions.

The notion "family" of effects and transitions means that in this stage we can postpone the decision on the specific effects, but rather decide on a group of effects that belongs to the same family (i.e. have similar objective or properties). For example—"ROI" effect consists of all effects that are aimed to emphasize a region of interest, but may have several specific implementations (e.g.—based on the editing style, timing considerations, etc'), and "Split" transition consists of all effects in which the frame is split into two.

Moreover, different scribbles can be used as input to the implementation of "effect families". For example, FIG. 14 shows an implementation of "ROI" effect that uses a user scribble (of a star). Scribble 33 of FIG. 3 describes an implementation of a "Split" transition that uses a different user scribble. For each family of effects (or transitions), the suitability of implementing it using a given family of scribbles or given scribble-attributes can be assigned manually (according to graphical considerations) as demonstrated in FIG. 23. These matches might have weights (measures of the fitness) and there might be complex rules (e.g.—an effect might require a combination of specific scribble families and some attributes). It should be noted that the implementation of some of the effects and transitions may not correspond to any scribble. For example, if there are many transitions between clips, and only a few scribbles.

All of the above inputs enter the rough production optimization stage (215), which selects (box 218) the families of effects and transitions for each selected asset (video clip or photo), and for each pair of consecutive assets. For example—apply an "ROI" effect on clip 1, and then use a "WIPE" transition from clip1 to photo 3. This stage also determines the timing of the effects and transitions.

This selection can done by optimizing a measures that takes into account:
1. The fitness between the video/photo content and the effects and transitions (for example.—a "ROI" effect such as the one described in FIG. 14, can be applied when there is a detected object of interest such as the detected person in FIG. 14 (142)). Another example—"Zoom In" transition usually fits well to a transition between clips from different scenes, and less for a transition between clips from the same scene.
2. Synchronizing the transitions with the soundtrack.
3. Maximizing the fit between the music and the effects (e.g.—emphasizing important moments in the music). For example—we would like to set the timing of some effects to appear exactly at the moment of a down-beat in the music.
4. Maximizing the usage of the user's scribbles, i.e—maximizing the number of effects and transitions that are implemented using user-scribbles versus those that are independent in the user scribbles.

Finally, there is a final tuning step (219), in which the specific parameters and attributes of the scribbles are used to determining the actual implementation of each effect and transition. E.g.—the specific effect in FIG. 14 was created by using the star scribble to implement a "ROI" effect. More examples—the speed of a "Wipe" effect (a known effect where a clip is replaced by another one from one of the frame sides) an be determined by the diameter of the curved line which corresponds to this effect. The speed of the rotation in a "Rotation" effect (32) can be determined by the density of the spiral; the direction of the motion in the transition effect in (31) can be determined by the orientation of the drawn arrow, etc'. The set of parameters that is relevant for each effect can be determined in advance manually.

This long set of decisions is decoded into a script of orders for the renderer:
Play clip 1 from second 0 to 3.2.
Apply effect7 with parameters (p1, p2, p3) at times 0.3 to 2.4.
Apply transition3 from second 3.2 to second 3.6.
Play clip2 from second 3.6 to 7.4.
This script (together with the input assets) is used to render the edited video.

Figure 23:
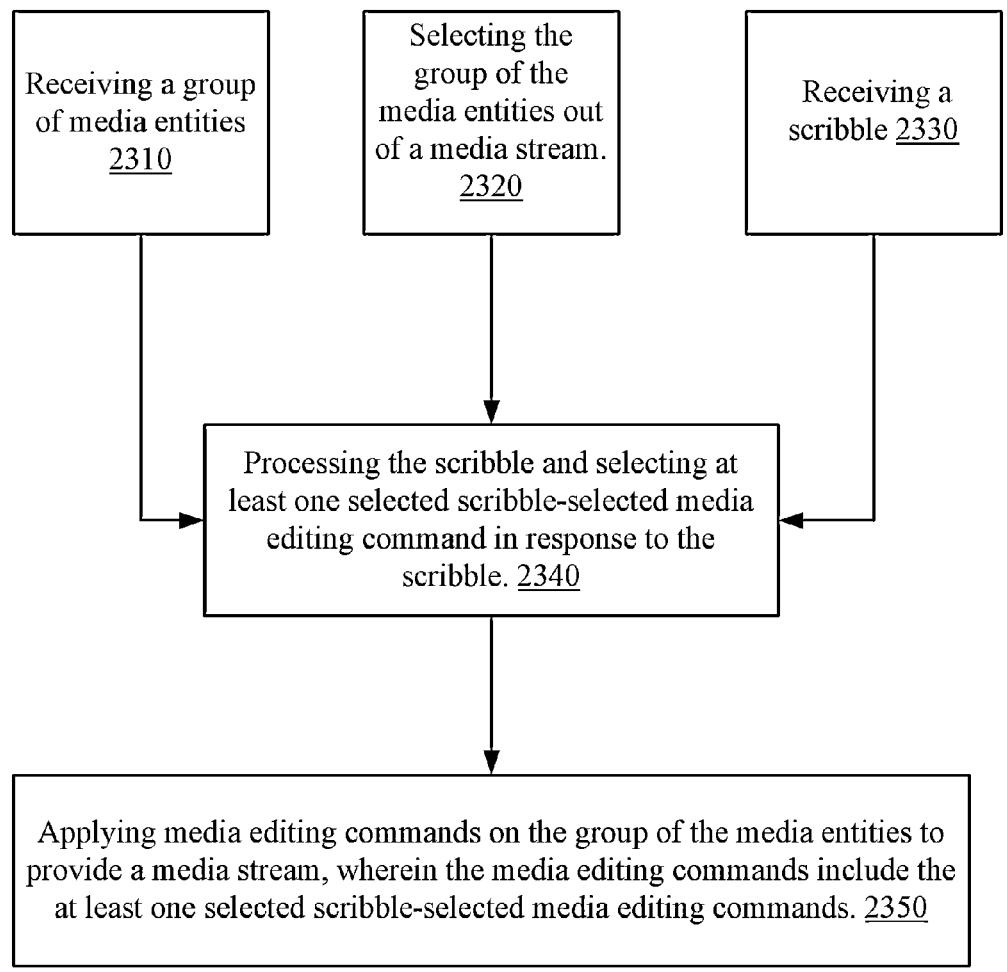
FIG. 23 illustrates a method according to an embodiment of the invention.

FIG. 23 illustrates a method 2300 according to an embodiment of the invention.

Method 2300 may start by stages 2310, 2320 and/or 2330.

Stage 2310 includes receiving a group of media entities (see for example block 191 of FIG. 19). Stage 2310 may also include receiving an editing theme.

Stage 2310 includes selecting (see for example block 192 of FIG. 19) the group of the media entities out of a media stream. The selection can be based upon a method as disclosed in U.S. patent application Ser. No. 13/041,457 which is incorporated by reference.

Stage 2330 includes receiving a scribble (see for example block 201 of FIG. 20).

Stages 2310, 2320 and 2330 may be followed by stage 2340 of processing the scribble (see for example block 195 of FIG. 19, blocks 202-203, 204, 205, 207 and 209 of FIG. 20) and selecting (see for example block 215 of FIG. 21 and block 205 of FIG. 20) at least one selected scribble-selected media editing command in response to the scribble.

Stage 2340 may be followed by stage 2350 of applying media editing commands (see for example block 193 of FIG. 19 and blocks 215, 218 and 219 of FIG. 21) on the group of the media entities to provide a media stream, wherein the media editing commands include the at least one selected scribble-selected media editing commands.

Stage 2340 may include at least one out of:
a. Extracting one or more attributes of the scribble and selecting the at least one scribble-selected media editing command in response to the one or more attributes of the scribble.
b. Segmenting the scribble to scribble segments, searching for a match between each scribble segment and a predetermined scribble segments associated with scribble-selected media editing commands, and selecting a scribble-selected media editing command to be applied on the group of media entities if the scribble-selected media editing command is associated with a predetermined scribble segments that matches one of the scribble segments.
c. Applying a descriptor based matching algorithm.
d. Applying a shape based matching algorithm.
e. Extracting an attribute of the scribble and selecting a scribble-selected media editing command to be applied on the group of media entities if the scribble-selected media editing command is associated with the attribute of the scribble and is not associated with any of the predetermined scribble segments.
f. Extracting an attribute of the scribble and selecting a scribble-selected media editing command to be applied on the group of media entities if the scribble-selected media editing command is associated with the attribute of the scribble.
g. Extracting an attribute of the scribble and selecting a selected scribble-selected media editing command to be applied on the group of media entities if the selected scribble-selected media editing command is associated with the attribute of the scribble.
h. Extracting an attribute of the scribble; selecting a selected set of scribble-selected media editing commands in response to the attribute of the scribble; and selecting out of the selected set a selected scribble-selected media editing command to be applied on the group of media entities in response to a selection parameter that differs from the attribute of the scribble. The selection parameters may be another attribute of the scribble, may be responsive to a content of at least one media entity of the group of media entities.
i. Presenting to a person media editing commands that belong to the selected set; and receiving from the person the selection parameter.
j. Determining the selection parameters in response to relationship between different selected scribble-selected media editing commands to be applied on the group of the media entities.
k. Searching for a match between a scribble and a predetermined scribble associated with scribble-selected media editing commands, and selecting a scribble-selected media editing command to be applied on the group of media entities if the scribble-selected media editing command is associated with a predetermined scribble that matches one of the scribble segments.
l. Extracting one or more characteristics of the scribble and selecting the at least one scribble-selected media editing command in response to the one or more characteristics of the scribble.
m. Extracting a characteristic of the scribble and selecting a scribble-selected media editing command to be applied on the group of media entities if the scribble-selected media editing command is associated with the characteristic of the scribble and is not associated with any of the predetermined scribbles.
n. Extracting a characteristic of the scribble and selecting a scribble-selected media editing command to be applied on the group of media entities if the scribble-selected media editing command is associated with the characteristic of the scribble.
o. Extracting characteristics of the scribble; selecting a selected set of scribble-selected media editing commands in response to a first characteristic of the scribble; and selecting out of the selected set a selected scribble-selected media editing command to be applied on the group of media entities in response to a second characteristic of the scribble. The second characteristic may be responsive to a content of at least one media entity of the group of media entities.
p. Extracting characteristics of the scribble; selecting a selected set of scribble-selected media editing commands in response to a first characteristic of the scribble; presenting to a person media editing commands that belong to the selected set; and receiving from the person the selection parameter.
q. Selecting at least one scribble-selected media editing command in response to a scribble and to the editing theme.
r. Extracting a characteristic of the scribble and selecting a selected scribble-selected media editing command to be applied on the group of media entities if the selected scribble-selected media editing command is associated with the characteristic of the scribble.
s. Extracting a first characteristic and a second characteristic of a set of scribbles, the first characteristic is indicative of a target media entity of the group of media entities and the second characteristic is indicative of an effect to be triggered by the target media entity; and applying a media editing command that applies the effect when triggered by the target media entity.
t. Selecting a scribble-selected media editing command in response to a combination of at least two scribbles of the set of scribbles.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium that stores instructions for:
   presenting a group of media entities to a user;
   receiving a scribble from the user;
   applying media editing commands to the group of the media entities to provide a media stream, wherein the media editing commands comprise at least one media editing command that is selected in response to the scribble;
   extracting characteristics of the scribble;
   selecting a selected set of scribble-selected media editing commands in response to a first characteristic of the scribble; and
   selecting out of the selected set a selected scribble-selected media editing command to be applied on the group of media entities in response to a second characteristic of the scribble.

2. The non-transitory computer readable medium according to claim 1, wherein the second characteristic is responsive to a content of at least one media entity of the group of media entities.

3. A method comprising:
   presenting a group of media entities to a user;
   receiving a scribble from the user;
   applying media editing commands to the group of the media entities to provide a media stream, wherein the media editing commands comprise at least one media editing command that is selected in response to the scribble;

extracting characteristics of the scribble;
selecting a selected set of scribble-selected media editing commands in response to a first characteristic of the scribble; and
selecting out of the selected set a selected scribble-selected media editing command to be applied on the group of media entities in response to a second characteristic of the scribble.

4. The method according to claim 3, wherein the second characteristic is responsive to a content of at least one media entity of the group of media entities.

5. A non-transitory computer readable medium that stores instructions for:
presenting a group of media entities to a user;
receiving a scribble from the user; and
applying media editing commands to the group of the media entities to provide a media stream, wherein the media editing commands comprise at least one media editing command that is selected in response to the scribble,
wherein the editing command applied to the media entities is further determined based on data retrieved from at least some of the media entities, and
wherein the media editing command is a non-rectangular cropping command and wherein the shape of the cropping is derived based on said data retrieved from the media entities.

6. A method for scribble base editing, the method comprising:
presenting a group of media entities to a user;
receiving a scribble from the user; and
applying media editing commands to the group of the media entities to provide a media stream, wherein the media editing commands comprise at least one media editing command that is selected in response to the scribble,
wherein the editing command applied to the media entities is further determined based on data retrieved from at least some of the media entities, and
wherein the media editing command is a non-rectangular cropping command and wherein the shape of the cropping is derived based on said data retrieved from the media entities.

* * * * *